United States Patent
Zhao et al.

(10) Patent No.: US 12,216,838 B2
(45) Date of Patent: Feb. 4, 2025

(54) STYLUS AND ELECTRONIC DEVICE COMPONENT

(71) Applicant: Honor Device Co., Ltd., Guangdong (CN)

(72) Inventors: Yong Zhao, Shenzhen (CN); Xin Mou, Shenzhen (CN); Yongfeng Peng, Shenzhen (CN); Beihang Zhang, Shenzhen (CN); Yongqiang Zang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/801,015

(22) PCT Filed: Feb. 9, 2022

(86) PCT No.: PCT/CN2022/075710
§ 371 (c)(1),
(2) Date: Aug. 19, 2022

(87) PCT Pub. No.: WO2022/193873
PCT Pub. Date: Sep. 22, 2022

(65) Prior Publication Data
US 2024/0201806 A1    Jun. 20, 2024

(30) Foreign Application Priority Data

Mar. 15, 2021  (CN) .......................... 202110293428.X
Apr. 16, 2021  (CN) .......................... 202110414564.X

(51) Int. Cl.
G06F 3/03   (2006.01)
G06F 1/16   (2006.01)
(Continued)

(52) U.S. Cl.
CPC ........ *G06F 3/03545* (2013.01); *G06F 1/1607* (2013.01); *G06F 1/1698* (2013.01);
(Continued)

(58) Field of Classification Search
CPC .. G06F 3/0383; G06F 3/0231; G06F 3/03545; G06F 3/0202
See application file for complete search history.

(56) References Cited

U.S. PATENT DOCUMENTS 8,928,635 B2    1/2015   Harley et al.
9,329,703 B2    5/2016   Falkenburg et al.
(Continued)

FOREIGN PATENT DOCUMENTS

CN    202067235 U    12/2011
CN    103164053 A    6/2013
(Continued)

*Primary Examiner* — Towfiq Elahi
(74) *Attorney, Agent, or Firm* — Leydig, Voit & Mayer, Ltd.

(57) ABSTRACT

A stylus and an electronic device component are disclosed. The stylus includes a stylus rod and a detachable stylus tip at one end of the stylus rod, and further includes a first electrode, a second electrode, and a circuit board. The first electrode is disposed in the stylus tip. The second electrode is disposed on an inner wall of the stylus rod, or the second electrode is disposed on a fastener in the stylus rod, and the second electrode is electrically connected to the second circuit board. This increases a distance between the first electrode and the second electrode, and reduces coupling between the first electrode and the second electrode. The stylus in embodiments of this application resolves a problem that writing accuracy of the stylus is reduced because the two electrodes in the stylus are easily coupled.

16 Claims, 10 Drawing Sheets

(51) Int. Cl.

| | | |
|---|---|---|
| *G06F 1/26* | (2006.01) | |
| *G06F 3/02* | (2006.01) | |
| *G06F 3/023* | (2006.01) | |
| *G06F 3/0354* | (2013.01) | |
| *G06F 3/038* | (2013.01) | |
| *G06F 3/041* | (2006.01) | |
| *G06F 3/044* | (2006.01) | |
| *G06F 3/04842* | (2022.01) | |
| *G06F 3/04883* | (2022.01) | |
| *G06F 40/166* | (2020.01) | |
| *H02J 7/34* | (2006.01) | |
| *H02J 50/10* | (2016.01) | |
| *H02J 50/80* | (2016.01) | |
| *H04W 72/21* | (2023.01) | |
| *H04W 72/23* | (2023.01) | |

(52) U.S. Cl.
CPC .............. *G06F 1/266* (2013.01); *G06F 3/021* (2013.01); *G06F 3/0231* (2013.01); *G06F 3/038* (2013.01); *G06F 3/0383* (2013.01); *G06F 3/0412* (2013.01); *G06F 3/04162* (2019.05); *G06F 3/0441* (2019.05); *G06F 3/0442* (2019.05); *G06F 3/04842* (2013.01); *G06F 3/04883* (2013.01); *G06F 40/166* (2020.01); *H02J 7/342* (2020.01); *H02J 50/10* (2016.02); *H02J 50/80* (2016.02); *H04W 72/21* (2023.01); *H04W 72/23* (2023.01); *G06F 3/0202* (2013.01); *G06F 2200/1632* (2013.01); *G06F 2203/0384* (2013.01)

(56) References Cited

U.S. PATENT DOCUMENTS

| | | | |
|---|---|---|---|
| 9,575,573 | B2 | 2/2017 | Chang |
| 9,874,966 | B2 | 1/2018 | Ribeiro |
| 10,007,364 | B2 | 6/2018 | Zimmerman et al. |
| 10,025,401 | B2 | 7/2018 | Bhandari et al. |
| 10,025,403 | B2 | 7/2018 | Haran et al. |
| 10,296,108 | B2 | 5/2019 | Gray et al. |
| 10,310,636 | B2 | 6/2019 | Haran et al. |
| 10,345,926 | B2 | 7/2019 | Nakaya |
| 10,496,192 | B2 | 12/2019 | Zhang et al. |
| 11,079,863 | B2 | 8/2021 | Hara et al. |
| 11,379,059 | B2 | 7/2022 | He et al. |
| 2009/0167702 | A1* | 7/2009 | Nurmi .................. G06F 3/04883 345/173 |
| 2015/0077403 | A1* | 3/2015 | Bell ....................... G06F 3/0442 345/179 |
| 2015/0116284 | A1* | 4/2015 | Black ..................... G09G 5/373 345/179 |
| 2015/0138164 | A1 | 5/2015 | Hinson |
| 2016/0277835 | A1* | 9/2016 | Kim ........................ G06F 1/1688 |
| 2017/0322643 | A1* | 11/2017 | Eguchi ................ G06F 3/04162 |
| 2018/0107284 | A1 | 4/2018 | Hou et al. |
| 2018/0120958 | A1 | 5/2018 | Yeh et al. |
| 2018/0188829 | A1 | 7/2018 | Ouyang et al. |
| 2020/0110477 | A1* | 4/2020 | Park ...................... G06F 3/03545 |
| 2020/0285279 | A1 | 9/2020 | Zimmerman et al. |
| 2021/0165510 | A1* | 6/2021 | Yang ...................... G06F 3/0441 |
| 2023/0133003 | A1* | 5/2023 | Noguchi ............ G06F 3/04162 345/179 |

FOREIGN PATENT DOCUMENTS

| | | |
|---|---|---|
| CN | 103688237 B | 5/2016 |
| CN | 106716314 A | 5/2017 |
| CN | 107368203 A | 11/2017 |
| CN | 103620529 B | 12/2017 |
| CN | 107548485 A | 1/2018 |
| CN | 107924242 A | 4/2018 |
| CN | 108027668 A | 5/2018 |
| CN | 108399023 A | 8/2018 |
| CN | 108803900 A | 11/2018 |
| CN | 109478108 A | 3/2019 |
| CN | 109683733 A | 4/2019 |
| CN | 105718079 B | 6/2019 |
| CN | 109923502 A | 6/2019 |
| CN | 110196649 A | 9/2019 |
| CN | 110471546 A | 11/2019 |
| CN | 110609627 A | 12/2019 |
| CN | 209842573 U | 12/2019 |
| CN | 110770681 A | 2/2020 |
| CN | 110794977 A | 2/2020 |
| CN | 111837095 A | 10/2020 |
| CN | 211787016 U | 10/2020 |
| CN | 112214118 A | 1/2021 |
| CN | 113268148 A | 8/2021 |
| TW | 201839564 A | 11/2018 |
| WO | 2020140947 A1 | 7/2020 |

\* cited by examiner

STYLUS AND ELECTRONIC DEVICE COMPONENT

CROSS-REFERENCE TO RELATED APPLICATIONS

This application is a National Stage of International Application No. PCT/CN2022/075710, filed on Feb. 9, 2022, which claims priority to Chinese Patent Application No. 202110293428.X, filed on Mar. 15, 2021, and Chinese Patent Application No. 202110414564.X, filed on Apr. 16, 2021. The disclosures of each of the aforementioned applications are hereby incorporated by reference in their entireties.

TECHNICAL FIELD

Embodiments of this application relate to the field of terminal technologies, and in particular, to a stylus and an electronic device component.

BACKGROUND

With explosive growth of smartphones and tablets (Pads), increasingly more application software requires higher precision touch, for example, painting software. Therefore, a stylus is gradually widely used, and a performance requirement of the stylus is also increasingly higher, especially application experience of the stylus is increasingly more important.

According to different working principles, the stylus mainly includes an inductive stylus and a capacitive stylus. Currently, a transmitting electrode and a receiving electrode are usually disposed in the capacitive stylus. The transmitting electrode is configured to transmit a signal to a touchscreen, and the receiving electrode is configured to receive a signal sent by the touchscreen. Two transmitting electrodes are usually disposed in the stylus, and the two transmitting electrodes are both disposed in a stylus tip of the stylus. One of the transmitting electrodes is disposed at a tip part of the stylus tip, and the transmitting electrode is configured to detect a location of the stylus tip on the touchscreen. The other transmitting electrode is disposed at another part in the stylus tip, and is configured to monitor an inclination of the stylus relative to the touchscreen.

However, coupling is likely to occur between two electrodes (for example, the two transmitting electrodes) in the stylus. This affects writing accuracy of the stylus, and affects use performance of the stylus.

SUMMARY

Embodiments of this application provide a stylus and an electronic device component, to improve operation accuracy of the stylus and improve use performance of the stylus.

An embodiment of this application provides a stylus, including a stylus rod and a detachable stylus tip at one end of the stylus rod. The stylus further includes a first electrode, a second electrode, a first circuit board, and a second circuit board. The first electrode is disposed in the stylus tip, the first electrode is connected to the first circuit board, and the first circuit board is electrically connected to the second circuit board. The second electrode is disposed on an inner wall of the stylus rod, or the second electrode is disposed on a fastener in the stylus rod, the second electrode is electrically connected to the second circuit board or the first circuit board, and the second electrode is used to transmit a second signal for measuring an inclination angle of the stylus rod relative to a touchscreen.

According to the stylus provided in this embodiment of this application, the first electrode is disposed in the stylus tip, and the second electrode is disposed on the inner wall of the stylus rod or the fastener in the stylus rod, to increase a distance between the second electrode and the first electrode, reduce coupling between the second electrode and the first electrode, and improve accuracy of detecting a location and an inclination angle of the stylus by the electronic device, so as to improve operation accuracy of the stylus and improve use performance of the stylus.

In a possible implementation, the second electrode is disposed in a part that is in the stylus rod and that is close to the stylus tip.

The second electrode is disposed in the part that is in the stylus rod and that is close to the stylus tip, to increase a distance between the second electrode and the first electrode, reduce or avoid coupling between the second electrode and the first electrode, and improve accuracy of detecting a location and an inclination angle of the stylus by the electronic device. In addition, a distance between the second electrode and the touchscreen is short, and strength of a signal sent by the second electrode to the electronic device is high, so that accuracy of measuring the inclination angle of the stylus by the electronic device can be ensured.

In a possible implementation, the fastener is a connecting sleeve, and the connecting sleeve is fastened to the stylus rod.

In a possible implementation, the stylus rod includes a tapered cylinder section and a straight cylinder section, the tapered cylinder section is located between the stylus tip and the straight cylinder section, the second electrode is disposed on an inner wall of the tapered cylinder section, and at least part of the connecting sleeve is located in the tapered cylinder section.

In a possible implementation, the connecting sleeve is a conductive sleeve, and the second electrode is electrically connected to the first circuit board or the second circuit board through the connecting sleeve.

In a possible implementation, a conductive spring is disposed on an outer wall of the connecting sleeve, and the second electrode is in contact with the conductive spring; and a flexible electrical connecting piece is connected between the outer wall of the connecting sleeve and the first circuit board, or a flexible electrical connecting piece is connected between the outer wall of the connecting sleeve and the second circuit board.

The conductive spring is disposed on the outer wall of the conductive connecting sleeve, the second electrode on the inner wall of the stylus rod is in contact with the conductive spring, and the outer wall of the connecting sleeve is connected to the first circuit board and the second circuit board through the flexible electrical connecting piece, so that the second electrode can be electrically connected to the second circuit board through the sleeve.

In a possible implementation, the second electrode is disposed on the outer wall of the connecting sleeve.

In a possible implementation, an accommodating groove is disposed on the outer wall of the connecting sleeve, a protruding part fitting the accommodating groove is disposed on the second electrode, and the second electrode is disposed on the outer wall of the connecting sleeve through fitting between the protruding part and the accommodating groove.

In a possible implementation, the connecting sleeve is a conductive sleeve, and a flexible electrical connecting piece is connected between the outer wall of the connecting sleeve and the first circuit board, or a flexible electrical connecting piece is connected between the outer wall of the connecting sleeve and the second circuit board.

In a possible implementation, the flexible electrical connecting piece is connected to the second electrode, one end of the flexible electrical connecting piece extends into the accommodating groove to be in contact with the second electrode, and the other end of the flexible electrical connecting piece is connected to the first circuit board or the second circuit board.

The accommodating groove is disposed on the outer wall of the connecting sleeve, and the protruding part is disposed on the second electrode and fits the accommodating groove, to avoid rotation of the second electrode on the outer wall of the connecting sleeve, and limit the second electrode on the connecting sleeve. For a conductive connecting sleeve, the flexible electrical connecting piece is connected to the outer wall of the connecting sleeve, and the flexible electrical connecting piece is connected to the first circuit board or the second circuit board, so that the second electrode is electrically connected to the second circuit board. For a non-conductive connecting sleeve, one end of the flexible electrical connecting piece extends into the accommodating groove to be connected to the second electrode, and the other end of the flexible electrical connecting piece is connected to the first circuit board or the second circuit board, so that the second electrode is electrically connected to the second circuit board.

In a possible implementation, the second electrode is integrated on a flexible circuit board, the flexible circuit board is attached to the outer wall of the connecting sleeve, a pin protrudes from the flexible circuit board, and the pin is connected to the first circuit board or the second circuit board.

The second electrode is integrated on the flexible circuit board, the flexible circuit board is attached to the outer wall of the connecting sleeve, and the pin protruding from the flexible circuit board is connected to the first circuit board or the second circuit board, so that the second electrode can be electrically connected to the second circuit board.

In a possible implementation, the first electrode is a transmitting electrode, and the second electrode includes a signal transmitting module and a signal receiving module.

The signal transmitting module and the signal receiving module are integrated on the second electrode, so that the second electrode can send an excitation signal to the electronic device and receive a signal sent by the electronic device. In this way, a receiving electrode does not need to be additionally disposed in the stylus, to save space in the stylus and facilitate component of the stylus.

In a possible implementation, one end of the stylus tip is a writing end, the other end of the stylus tip is a connecting end, and the connecting end extends into the stylus rod; and the first electrode is located at the writing end.

The first electrode is disposed at the writing end of the stylus tip, so that accuracy of detecting a location of the stylus by the electronic device can be improved.

In a possible implementation, the stylus further includes a spindle component and a pressure sensing component, the pressure sensing component includes a swing piece and a strain gauge, and the spindle component includes at least a force transmission shaft.

One end of the force transmission shaft is connected to the connecting end of the stylus tip, the other end of the force transmission shaft is connected to an outer wall of the swing piece, the strain gauge is attached to one end of the swing piece facing the second circuit board, and the strain gauge is electrically connected to the first circuit board or the second circuit board.

The force transmission shaft and the pressure sensing component are disposed, the one end of the force transmission shaft is connected to the stylus tip, the other end of the force transmission shaft is connected to the swing piece of the pressure sensing component, the stylus tip is forced to move toward the stylus rod to drive the force transmission shaft to move, and the force transmission shaft drives the swing piece to swing. The strain gauge detects strain force generated by swing of the swing piece, and transmits the strain force to the second circuit board in a form of a signal, and the second circuit board adjusts a writing thickness of the stylus tip based on strength of the strain force signal. The force transmission shaft is connected to the outer wall of the swing piece, to facilitate component of the force transmission shaft and the swing piece, and improve component efficiency.

In a possible implementation, the force transmission shaft includes a first section and a second section, the swing piece includes a first side and a second side that are opposite to each other, and a swing portion of the swing piece is connected between the first side and the second side.

The first section of the force transmission shaft is connected to the connecting end of the stylus tip, the swing piece is disposed on the second section of the force transmission shaft, an outer wall of the first side of the swing piece is connected to the second section of the force transmission shaft, and the second side of the swing piece is fixedly disposed in the stylus rod.

The second section of the force transmission shaft is fixedly connected to the outer wall of the first side of the swing piece, and the second side of the swing piece is fixedly connected to the inside of the stylus rod, so that the force transmission shaft moves to drive the first side of the swing piece to move, and the second side of the swing piece is fixed. In this way, the swing portion of the swing piece swings and deforms, and the strain gauge detects strain force generated by deformation of the swing portion, and transmits the strain force to the second circuit board in a form of a signal.

An embodiment of this application further provides an electronic device component, including an electronic device and the stylus described above.

The electronic device provided in this embodiment of this application includes a touchscreen. The stylus is used to operate the touchscreen of the electronic device to provide an input to the electronic device. The electronic device performs an operation in response to the input based on the input of the stylus. Based on the stylus, a first electrode is disposed in a stylus tip, and a second electrode is disposed in a stylus rod, to increase a distance between the second electrode and the first electrode, reduce coupling between the second electrode and the first electrode, and improve accuracy of detecting a location and an inclination angle of the stylus by the electronic device, so as to improve operation accuracy of the stylus, improve use performance of the stylus, and improve performance of interaction between the stylus and the electronic device.

In a possible implementation, the electronic device component further includes: a wireless keyboard, where the wireless keyboard includes an accommodating portion for accommodating the stylus.

In a possible implementation, the accommodating portion is a cavity of an opening at at least one end.

DESCRIPTION OF EMBODIMENTS

The terms used in embodiments of this application are merely intended to explain specific embodiments of this application, but are not intended to limit this application.

Figure 1:
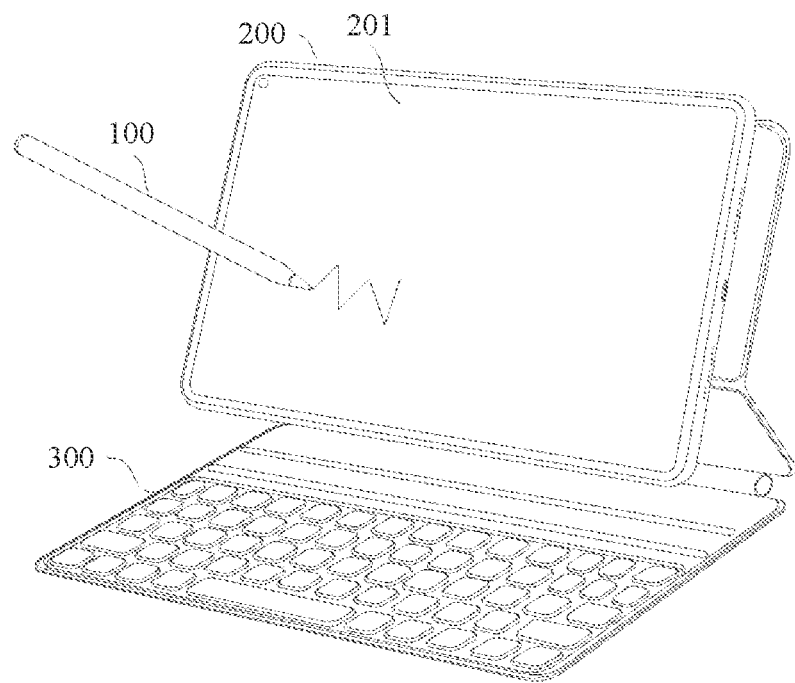
FIG. 1 is a schematic diagram of a scenario to which an embodiment of this application is applicable.

FIG. 1 is a schematic diagram of a scenario to which an embodiment of this application is applicable. Refer to FIG. 1. The scenario includes a stylus 100, an electronic device 200, and a wireless keyboard 300. In FIG. 1, an example in which the electronic device 200 is a tablet is used for description. The stylus 100 and the wireless keyboard 300 may provide an input to the electronic device 200. The electronic device 200 performs an operation in response to the input based on the input of the stylus 100 or the wireless keyboard 300. A touch area may be disposed on the wireless keyboard 300. The stylus 100 may operate the touch area of the wireless keyboard 300 to provide an input to the wireless keyboard 300, and the wireless keyboard 300 may perform an operation in response to the input based on the input of the stylus 100. In an embodiment, the stylus 100 and the electronic device 200, the stylus 100 and the wireless keyboard 300, and the electronic device 200 and the wireless keyboard 300 may be interconnected through a communication network, to implement interaction between wireless signals. The communication network may include but is not limited to the following: a Wi-Fi hotspot network, a Wi-Fi peer-to-peer (P2P) network, a Bluetooth network, a ZigBee network, or a near field communication (NFC) network.

The stylus 100 may include but is not limited to the following: an inductive stylus and a capacitive stylus. The electronic device 200 includes a touchscreen 201. When the stylus 100 is the inductive stylus, an electromagnetic induction board needs to be integrated on the touchscreen 201 of the electronic device 200 interacting with the stylus 100. A coil is distributed on the electromagnetic induction board, and a coil is also integrated in the inductive stylus. According to an electromagnetic induction principle, the inductive stylus can accumulate electric energy with movement of the inductive stylus in a magnetic field range generated by the electromagnetic induction board. The inductive stylus can transmit the accumulated electric energy to the electromagnetic induction board through the coil in the inductive stylus and free oscillation. The electromagnetic induction board may scan the coil on the electromagnetic induction board based on the electric energy from the inductive stylus, and calculate a location of the inductive stylus on the touchscreen 201.

The capacitive stylus may include: a passive capacitive stylus and an active capacitive stylus.

One or more electrodes may be disposed in the active capacitive stylus (for example, a stylus tip). The active capacitive stylus may transmit a signal through the electrode. When the stylus 100 is the active capacitive stylus, an electrode array needs to be integrated on the touchscreen 201 of the electronic device 200 interacting with the stylus 100. In an embodiment, the electrode array may be a capacitive electrode array. The electronic device 200 may receive a signal from the active capacitive stylus through the electrode array, and when receiving the signal, identify a location of the active capacitive stylus on the touchscreen and an inclination angle of the active capacitive stylus based on a change in a capacitance value on the touchscreen 201.

Figure 2A:
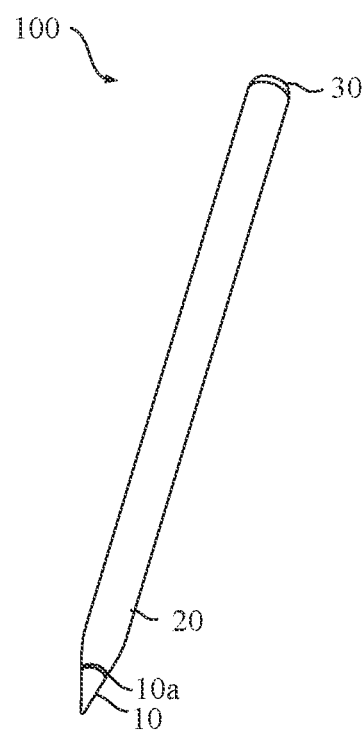
FIG. 2A is a schematic diagram of a structure of a stylus according to an embodiment of this application.

FIG. 2A is a schematic diagram of a structure of a stylus according to an embodiment of this application. Refer to FIG. 2A. The stylus 100 may include a stylus tip 10, a stylus rod 20, and a rear cover 30. The inside of the stylus rod 20 is in a hollow structure. The stylus tip 10 and the rear cover 30 are respectively located at two ends of the stylus rod 20. The rear cover 30 and the stylus rod 20 may be through plugging or snapping. For a fitting relationship between the stylus tip 10 and the stylus rod 20, refer to descriptions in FIG. 2B.

Figure 2B:
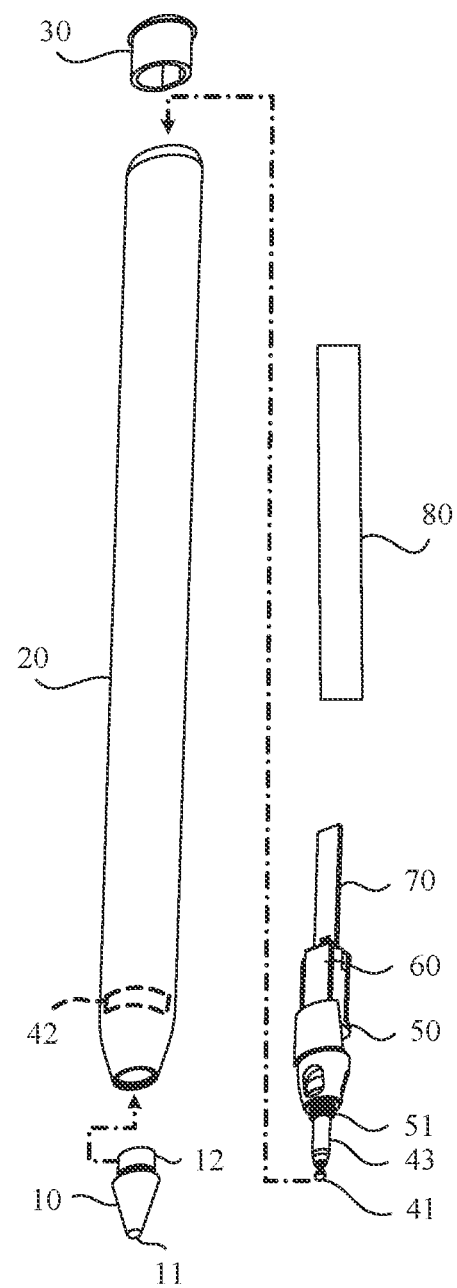
FIG. 2B is a schematic diagram of a partially split structure of a stylus according to an embodiment of this application.

FIG. 2B is a schematic diagram of a partially split structure of a stylus according to an embodiment of this application. Refer to FIG. 2B. The stylus 100 further includes a spindle component 50. The spindle component 50 is located in the stylus rod 20, and the spindle component 50 is slidably disposed in the stylus rod 20. The spindle component 50 has an external screw thread 51, and the stylus tip 10 includes a writing end 11 and a connecting end 12. The connecting end 12 of the stylus tip 10 has an internal screw thread (not shown) fitting the external screw thread 51.

When the spindle component 50 is assembled into the stylus rod 20, the connecting end 12 of the stylus tip 10 extends into the stylus rod 20 and is threadedly connected to the external screw thread 51 of the spindle component 50. In some other examples, the connecting end 12 of the stylus tip 10 may also be connected to the spindle component 50 in a detachable manner such as snapping. The connecting end 12 of the stylus tip 10 is detachably connected to the spindle component 50, to implement replacement of the stylus tip 10.

To detect pressure applied to the writing end 11 of the stylus tip 10, as shown in FIG. 2A, there is a gap 10a between the stylus tip 10 and the stylus rod 20. In this way, it can be ensured that when the writing end 11 of the stylus tip 10 is subjected to an external force, the stylus tip 10 can move toward the stylus rod 20, and movement of the stylus tip 10 drives the spindle component 50 to move in the stylus rod 20. To detect the external force, as shown in FIG. 2B, a pressure sensing component 60 is disposed on the spindle component 50. A part of the pressure sensing component 60 is fixedly connected to a fastener in the stylus rod 20, and a part of the pressure sensing component 60 is fixedly connected to the spindle component 50. In this way, when the spindle component 50 moves with the stylus tip 10, because the part of the pressure sensing component 60 is fixedly connected to the fastener in the stylus rod 20, movement of the spindle component 50 drives deformation of the pressure sensing component 60, and deformation of the pressure sensing component 60 is transmitted to a circuit board 70 (for example, the pressure sensing component 60 and the circuit board 70 can be electrically connected through a wire or a flexible circuit board). The circuit board 70 detects the pressure of the writing end 11 of the stylus tip 10 based on deformation of the pressure sensing component 60, and therefore controls a line thickness of the writing end 11 based on the pressure of the writing end 11 of the stylus tip 10.

It should be noted that detection on the pressure of the stylus tip 10 includes but is not limited to the foregoing method. For example, a pressure sensor may be further disposed at the writing end 11 of the stylus tip 10, and the pressure of the stylus tip 10 is detected by the pressure sensor.

In this embodiment, as shown in FIG. 2B, the stylus 100 further includes a plurality of electrodes. The plurality of electrodes may be, for example, a first transmitting electrode 41, a ground electrode 43, and a second transmitting electrode 42. The first transmitting electrode 41, the ground electrode 43, and the second transmitting electrode 42 are electrically connected to the circuit board 70. The first transmitting electrode 41 may be located in the stylus tip 10 and close to the writing end 11. The circuit board 70 may be configured to provide a signal control board to each of the first transmitting electrode 41 and the second transmitting electrode 42, and the first transmitting electrode 41 is configured to transmit a first signal. When the first transmitting electrode 41 is close to the touchscreen 201 of the electronic device 200, a coupling capacitance may be formed between the first transmitting electrode 41 and the touchscreen 201 of the electronic device 200, so that the electronic device 200 can receive the first signal. The second transmitting electrode 42 is configured to transmit a second signal, and the electronic device 200 can determine an inclination angle of the stylus 100 based on the received second signal. In this embodiment of this application, the second transmitting electrode 42 may be located on an inner wall of the stylus rod 20. In an example, the second transmitting electrode 42 may also be located on the spindle component 50.

The ground electrode 43 may be located between the first transmitting electrode 41 and the second transmitting electrode 42, or the ground electrode 43 may be located at the outer periphery of the first transmitting electrode 41 and the second transmitting electrode 42, and the ground electrode 43 is used to reduce coupling between the first transmitting electrode 41 and the second transmitting electrode 42.

When the electronic device 200 receives a first signal from the stylus 100, a capacitance value at a corresponding location on the touchscreen 201 changes. Based on this, the electronic device 200 may determine a location of the stylus 100 (or the stylus tip of the stylus 100) on the touchscreen 201 based on the change in the capacitance value on the touchscreen 201. In addition, the electronic device 200 may obtain the inclination angle of the stylus 100 by using a double-tip projection method in an inclination angle detection algorithm. Because locations of the first transmitting electrode 41 and the second transmitting electrode 42 in the stylus 100 are different, when the electronic device 200 receives the first signal and a second signal from the stylus 100, capacitance values at the two locations on the touchscreen 201 change. The electronic device 200 may obtain the inclination angle of the stylus 100 based on a distance between the first transmitting electrode 41 and the second transmitting electrode 42 and a distance between the two locations at which the capacitance values on the touchscreen 201 change. For more detailed descriptions of obtaining the inclination angle of the stylus 100, refer to related descriptions of the double-tip projection method in the conventional technology.

In this embodiment of this application, as shown in FIG. 2B, the stylus 100 further includes: a battery pack 80, where the battery pack 80 is configured to supply power to the circuit board 70. The battery pack 80 may include a lithium ion battery, or the battery pack 80 may include a nickel chromium battery, an alkaline battery, a nickel hydrogen battery, or the like. In an embodiment, the battery included in the battery pack 80 may be a rechargeable battery or a disposable battery. When the battery included in the battery pack 80 may be the rechargeable battery, the stylus 100 can charge the battery in the battery pack 80 through wireless charging.

Figure 3:
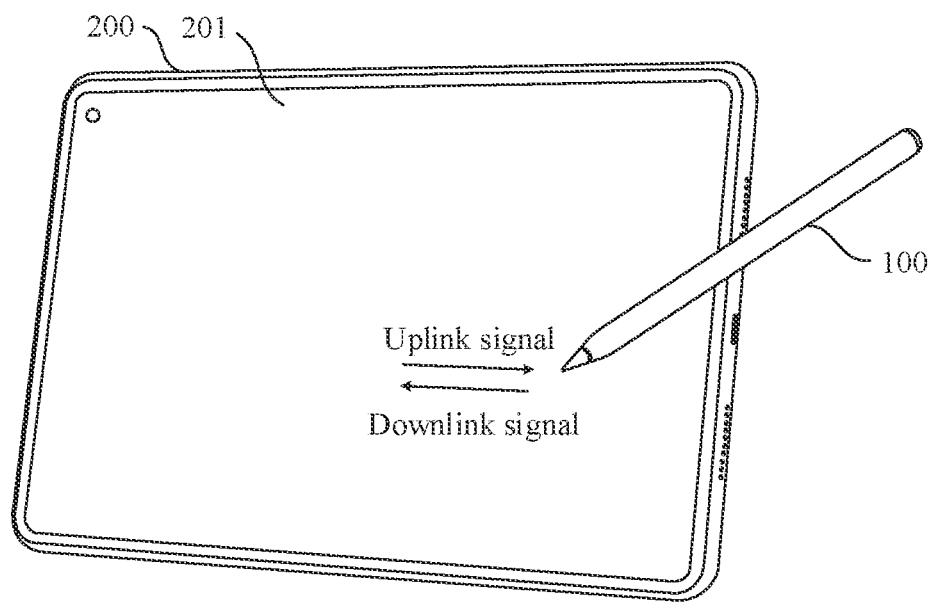
FIG. 3 is a schematic diagram of interaction between a stylus and an electronic device according to an embodiment of this application.

When the stylus 100 is an active capacitive stylus, as shown in FIG. 3, after the electronic device 200 is wirelessly connected to the stylus 100, the electronic device 200 may send an uplink signal to the stylus 100 through an electrode array integrated on the touchscreen 201. The stylus 100 may receive the uplink signal through a receiving electrode, and the stylus 100 transmits a downlink signal through a transmitting electrode (for example, the first transmitting electrode 41 and the second transmitting electrode 42). The downlink signal includes the first signal and the second signal. When the stylus tip 10 of the stylus 100 contacts the touchscreen 201, the capacitance value at the corresponding location on the touchscreen 201 changes, and the electronic device 200 may determine a location of the stylus tip 10 of the stylus 100 on the touchscreen 201 based on the capacitance value on the touchscreen 201. In an embodiment, an uplink signal and a downlink signal may be square wave signals.

Figure 4:
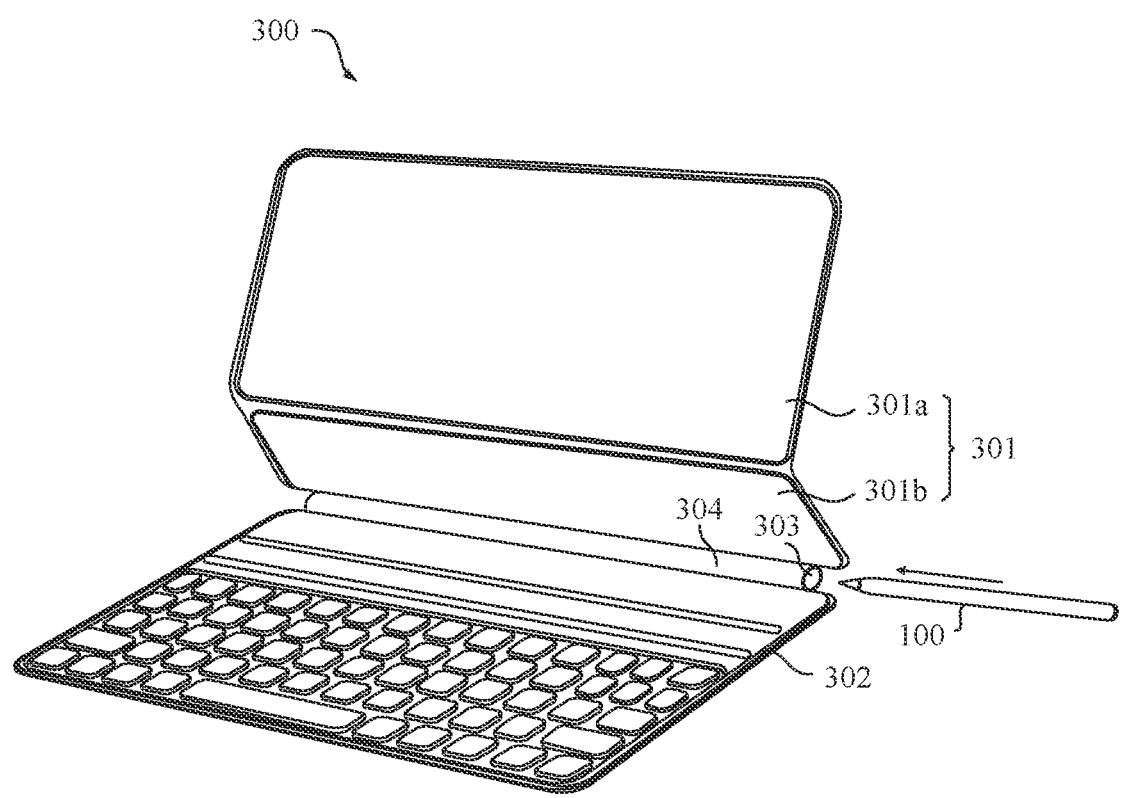
FIG. 4 is a schematic diagram of component of a stylus and a wireless keyboard according to an embodiment of this application.

In an embodiment, as shown in FIG. 4, the wireless keyboard 300 may include a first portion 301 and a second portion 302. For example, the wireless keyboard 300 may include: a keyboard body and a keyboard cover. The first portion 301 may be the keyboard cover, and the second portion 302 is the keyboard body. The first portion 301 is configured to place the electronic device 200, and the second portion 302 may be provided with a button, a touchpad, or the like for a user operation.

When the wireless keyboard 300 is used, the first portion 301 and the second portion 302 of the wireless keyboard 300 need to be opened. When the wireless keyboard 300 is not used, the first portion 301 and the second portion 302 of the wireless keyboard 300 can be closed. In an embodiment, the first portion 301 and the second portion 302 of the wireless keyboard 300 are rotatably connected to each other. For example, the first portion 301 and the second portion 302 may be connected through a rotating shaft or a hinge. Alternatively, in some examples, the first portion 301 and the second portion 302 are rotationally connected by using a flexible material (for example, a leather material or a cloth material). Alternatively, in some examples, the first portion 301 and the second portion 302 may be integrally formed, and a connection part between the first portion 301 and the second portion 302 is thinned, so that the connection part between the first portion 301 and the second portion 302 can be bent. A manner of the connection between the first portion 301 and the second portion 302 may include but is not limited to the foregoing rotational connection manners.

The first portion 301 may include at least two rotationally connected supports. For example, as shown in FIG. 4, the first portion 301 includes a first support 301a and a second support 301b. The first support 301a and the second support 301b are rotatably connected to each other. During use, the first support 301a and the second support 301b may be used to jointly support the electronic device 200 (for details, refer to FIG. 1). Alternatively, the first support 301a supports the second support 301b, and the second support 301b supports the electronic device 200. Refer to FIG. 4. The second support 301b and the second portion 302 are rotatably connected to each other.

As shown in FIG. 4, to accommodate the stylus 100, the wireless keyboard 300 may be provided with an accommodating portion 303 for accommodating the stylus 100. As shown in FIG. 4, the accommodating portion 303 is a cylindrical cavity. During accommodating, the stylus 100 is inserted into the accommodating cavity along an arrow direction in FIG. 4. In this embodiment, as shown in FIG. 4, the second portion 302 and the second support 301b are rotatably connected to each other through a connecting portion 304, and the accommodating portion 303 is disposed in the connecting portion 304. Because the connecting portion 304 may be a rotating shaft, a cavity may be disposed in the rotating shaft to form the accommodating portion 303.

Certainly, in some examples, the accommodating portion 303 may alternatively be disposed on a surface of the connecting portion 304, or the accommodating portion 303 may be disposed close to the connecting portion 304.

Figure 5A:
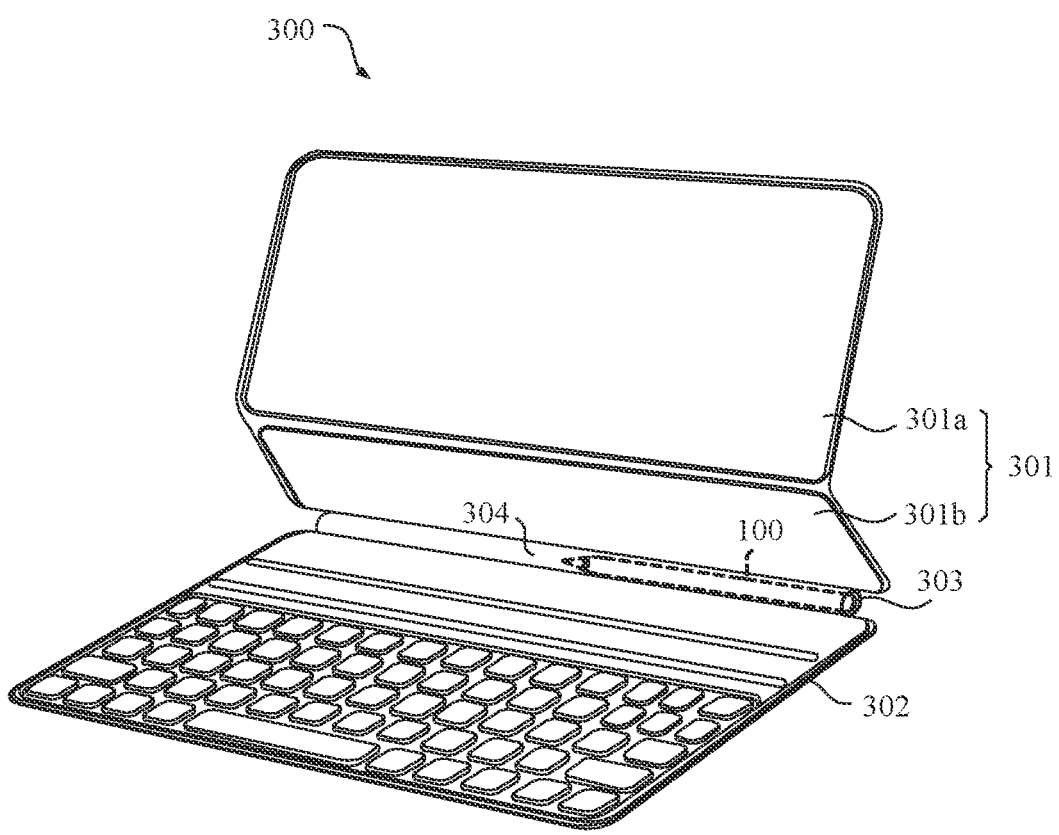
FIG. 5A is a schematic diagram in which a stylus is accommodated in an accommodating portion of a wireless keyboard according to an embodiment of this application.
Figure 5B:
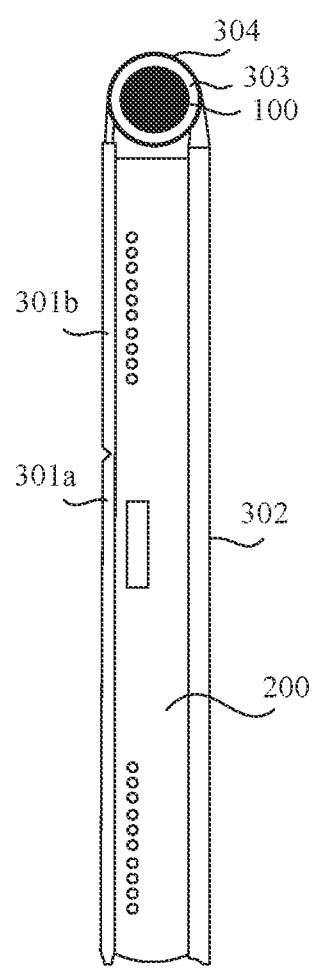
FIG. 5B is a schematic side view obtained when a stylus is accommodated in an accommodating portion of a wireless keyboard according to an embodiment of this application.

FIG. 5A is a schematic diagram in which a stylus is accommodated in an accommodating portion of a wireless keyboard according to an embodiment of this application. FIG. 5B is a schematic side view obtained when a stylus is accommodated in an accommodating portion of a wireless keyboard according to an embodiment of this application. Refer to FIG. 5B. The accommodating portion 303 is a circular cavity, and an inner diameter of the accommodating portion 303 is larger than an outer diameter of the stylus 100.

In an embodiment, a magnetic material may be disposed on an inner wall of the accommodating portion 303, and a magnetic material may be disposed in the stylus 100, to prevent the stylus 100 from falling out of the accommodating portion 303. The stylus 100 is adsorbed in the accommodating portion 303 through magnetic adsorption between the magnetic materials. Certainly, in some examples, when the stylus 100 is fastened to the accommodating portion 303, the stylus 100 is fastened to the accommodating portion 303 through magnetic adsorption or the like. For example, the stylus 100 may also be fastened to the accommodating portion 303 through snapping.

To facilitate removal of the stylus 100 from the accommodating portion 303, an eject mechanism may be disposed in the accommodating portion 303. For example, one end of the stylus 100 is pressed, so that the eject mechanism can drive one end of the stylus 100 to eject from the accommodating portion 303.

Figure 6:
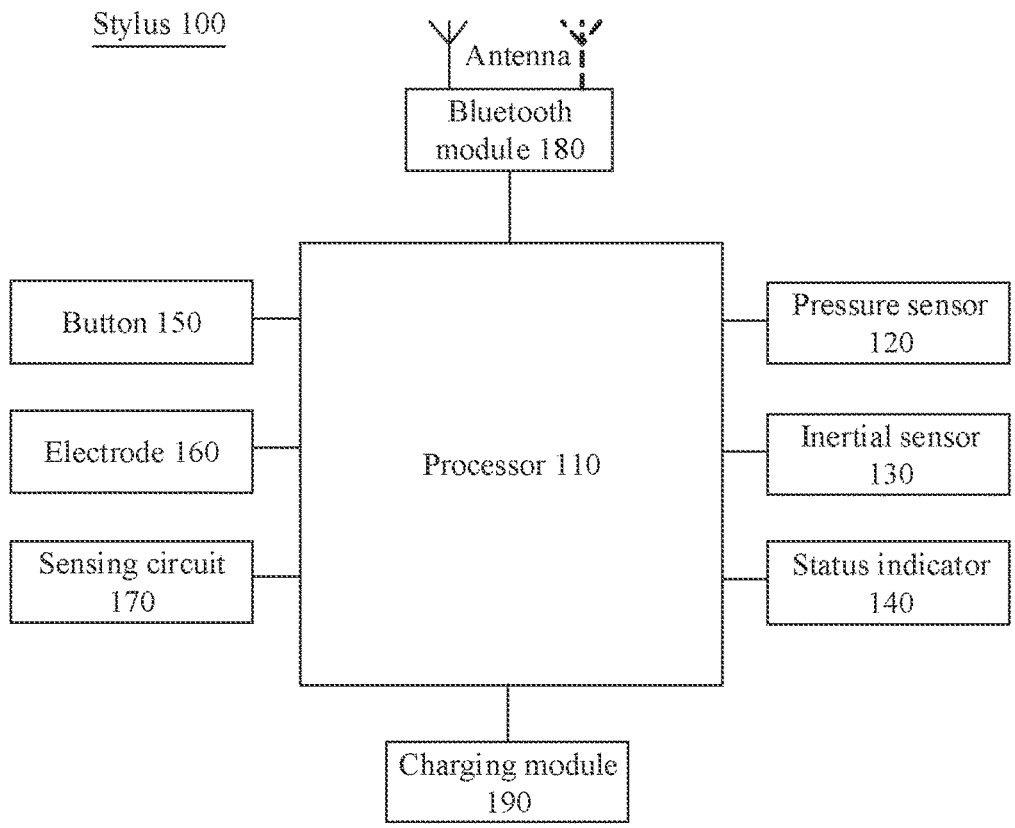
FIG. 6 is a schematic diagram of a hardware structure of a stylus according to an embodiment of this application.

FIG. 6 is a schematic diagram of a hardware structure of a stylus according to an embodiment of this application. Refer to FIG. 6. The stylus 100 may include a processor 110. The processor 110 may include storage and processing circuits configured to support operations of the stylus 100. The storage and processing circuits may include a storage apparatus (for example, a flash memory or another electrical programmable read-only memory configured as a solid-state drive) such as a non-volatile memory, a volatile memory (for example, a static or dynamic random access memory), and the like. The processing circuit in the processor 110 may be used to control an operation of the stylus 100. The processing circuit may be based on one or more microprocessors, microcontrollers, digital signal processors, baseband processors, power management units, audio chips, application-specific integrated circuits, and the like.

The stylus 100 may include one or more sensors. For example, the sensor may include a pressure sensor 120. The pressure sensor 120 may be disposed at the writing end 11 of the stylus 100 (as shown in FIG. 2B). Certainly, the pressure sensor 120 may also be disposed in the stylus rod 20 of the stylus 100. In this way, after one end of the stylus tip 10 of the stylus 100 is forced, the other end of the stylus tip 10 moves to apply force to the pressure sensor 120. In an embodiment, the processor 110 may adjust, based on pressure detected by the pressure sensor 120, a writing line thickness of the stylus tip 10 of the stylus 100.

The sensor may also include an inertial sensor 130. The inertial sensor 130 may include a three-axis accelerometer and a three-axis gyroscope, and/or another component configured to measure movement of the stylus 100. For example, a three-axis magnetometer may be included in the sensor in a configuration of a nine-axis inertial sensor. The sensor may also include an additional sensor, such as a temperature sensor, an ambient light sensor, an optical proximity sensor, a contact sensor, a magnetic sensor, a pressure sensor, and/or another sensor.

The stylus 100 may include a status indicator 140 such as a light-emitting diode and a button 150. The status indicator 140 is configured to prompt a user with a status of the stylus 100. The button 150 may include a mechanical button and a non-mechanical button, and the button 150 may be configured to collect button press information from the user.

In this embodiment of this application, the stylus 100 may include one or more electrodes 160 (for details, refer to the descriptions in FIG. 2B), one electrode 160 may be located at the writing end of the stylus 100, and one electrode 160 may be located in the stylus tip 10. For details, refer to the foregoing related descriptions.

The stylus 100 may include a sensing circuit 170. The sensing circuit 170 may sense capacitive coupling between the electrode 160 and a drive line on a capacitive touch sensor panel interacting with the stylus 100. The sensing circuit 170 may include an amplifier used to receive capacitive readings from the capacitive touch sensor panel, a clock used to generate a demodulation signal, a phase shifter used to generate a phase-shifted demodulation signal, a mixer used to demodulate capacitive readings by using an in-phase demodulation frequency component, a mixer used to demodulate capacitive readings by using a quadrature demodulation frequency component, and the like. A demodulation result of the mixer may be used to determine an amplitude proportional to a capacitance, so that the stylus 100 can sense contact with the capacitive touch sensor panel.

It may be understood that the stylus 100 may include a microphone, a speaker, an audio generator, a vibrator, a camera, a data port, and another device based on an actual requirement. The user may use these devices to provide commands to control operations of the stylus 100 and the electronic device 200 interacting with the stylus 100, and receive status information and another output.

The processor 110 may be configured to run software that is on the stylus 100 and that controls an operation of the stylus 100. In an operation process of the stylus 100, the software running on the processor 110 may process a sensor input, a button input, and an input from another apparatus to monitor movement of the stylus 100 and an input of another user. The software running on the processor 110 may detect a user command and may communicate with the electronic device 200.

To support wireless communication between the stylus 100 and the electronic device 200, the stylus 100 may include a wireless module. In FIG. 6, an example in which the wireless module is a Bluetooth module 180 is used for description. The wireless module may also be a Wi-Fi hotspot module, a Wi-Fi peer-to-peer module, or the like. The Bluetooth module 180 may include a radio frequency transceiver, for example, a transceiver. The Bluetooth module 180 may also include one or more antennas. The transceiver may transmit and/or receive a wireless signal through the antenna. The wireless signal may be a Bluetooth signal, a wireless local area network signal, a remote signal such as a cellular phone signal, a near field communication signal, or another wireless signal based on a type of the wireless module.

The stylus 100 may further include a charging module 190. The charging module 190 may support charging of the stylus 100 to provide power to the stylus 100.

It should be understood that the electronic device 200 in this embodiment of this application may be referred to as a user equipment (UE), a terminal, or the like. For example, the electronic device 200 may be a mobile terminal or a fixed terminal including a touchscreen, for example, a tablet (portable android device, PAD), a personal digital assistant (PDA), a handheld device having a wireless communication function, a computing device, a vehicle-mounted device, a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, or a wireless terminal in a smart home. A form of the terminal device is not specifically limited in this embodiment of this application.

Figure 7:
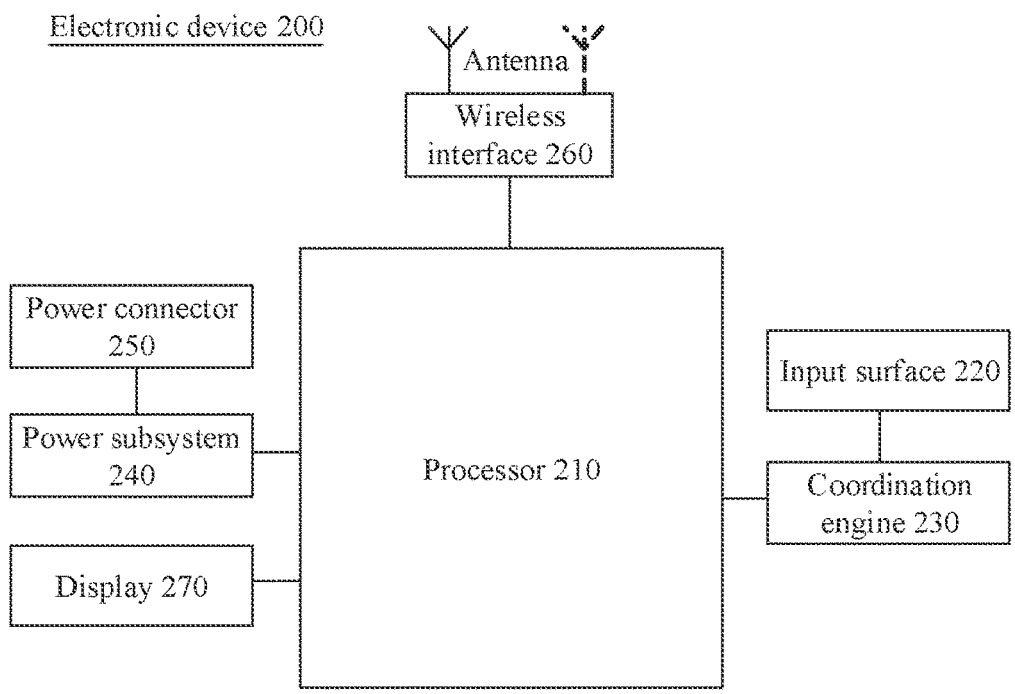
FIG. 7 is a schematic diagram of a hardware structure of an electronic device according to an embodiment of this application.

FIG. 7 is a schematic diagram of a hardware structure of an electronic device according to an embodiment of this application. Refer to FIG. 7. The electronic device 200 may include a plurality of subsystems. The subsystems cooperate to perform, coordinate, or monitor one or more operations or functions of the electronic device 200. The electronic device 200 includes a processor 210, an input surface 220, a coordination engine 230, a power subsystem 240, a power connector 250, a wireless interface 260, and a display 270.

For example, the coordination engine 230 may be configured to: communicate with another subsystem of the electronic device 200 and/or process data; communicate with and/or transact data with the stylus 100; measure and/or obtain one or more outputs of one or more analog or digital sensors (for example, touch sensors); measure and/or obtain one or more outputs of one or more sensor nodes in a sensor node array (for example, a capacitive sensing node array); receive and position a tip signal and a ring signal from the stylus 100; position the stylus 100 based on locations of a tip signal crossing area and a ring signal crossing area, and the like.

The coordination engine 230 of the electronic device 200 includes or may be communicatively coupled, in another manner, to a sensor layer located below the input surface 220 or integrated with the input surface. The coordination engine 230 uses the sensor layer to position the stylus 100 on the input surface 220, and uses the technology described in this specification to estimate an angular location of the stylus 100 relative to a plane of the input surface 220. In an embodiment, the input surface 220 may be referred to as a touchscreen 201.

For example, the sensor layer of the coordination engine 230 of the electronic device 200 is a grid of capacitive sensing nodes arranged in columns and rows. More specifically, a column trace array is set to be perpendicular to a row trace array. The sensor layer may be separated from another layer of the electronic device, or the sensor layer may be disposed directly on another layer. The another layer includes but is not limited to: a display stack layer, a force sensor layer, a digitizer layer, a polarizer layer, a battery layer, a structural or decorative shell layer, or the like.

The sensor layer can operate in a plurality of modes. If the sensor layer operates in mutual capacitance mode, a column trace and a row trace form a single capacitive sensing node (for example, a "vertical" mutual capacitance) at each overlapping point. If the sensor layer operates in self-capacitive mode, a column trace and a row trace form two (vertically aligned) capacitive sensing nodes at each overlapping point. In another implementation solution, if the sensor layer operates in mutual capacitance mode, adjacent column traces and/or adjacent row traces each may form a single capacitive sensing node (for example, a "horizontal" mutual capacitance). As described above, the sensor layer may monitor a change in a capacitance (for example, a mutual capacitance or a self-capacitance) presented at each capacitive sensing node to detect existence of the stylus tip 10 of the stylus 100 and/or touch of a finger of the user. In many cases, the coordination engine 230 may be configured to detect, through capacitive coupling, the tip signal and the ring signal received from the stylus 100 through the sensor layer.

The tip signal and/or the ring signal may include specific information and/or data that may be configured to enable the electronic device 200 to identify the stylus 100. Such information is usually referred to as "stylus identity" information in this specification. The information and/or the data may be received by the sensor layer, and interpreted, decoded, and/or demodulated by the coordination engine 230.

The processor 210 may use the stylus identity information to receive an input from more than one stylus simultaneously. Specifically, the coordination engine 230 may be configured to transmit, to the processor 210, a location and/or an angular location that are/is of each of several styluses and that are/is detected by the coordination engine 230. In another case, the coordination engine 230 may further transmit, to the processor 210, information about relative locations and/or relative angular locations that are of a plurality of styluses and that are detected by the coordination engine 230. For example, the coordination engine 230 may notify that a first stylus detected by the processor 210 is located at a location of a second stylus detected by the processor 210.

In another case, the tip signal and/or the ring signal may further include specific information and/or data used to enable the electronic device 200 to identify a specific user. Such information is usually referred to as "user identity" information in this specification.

The coordination engine 230 may forward the user identity information (if the user identity information can be detected and/or can be restored) to the processor 210. If the user identity information cannot be restored from the tip signal and/or the ring signal, the coordination engine 230 may optionally indicate to the processor 210 that the user identity information is not available. The processor 210 can use the user identity information in any proper manner (or a case in which the information does not exist), including but not limited to: accepting or rejecting an input from a specific user, allowing or denying access to a specific function of the electronic device, and the like. The processor 210 may use the user identity information to receive an input from more than one user simultaneously.

In another case, the tip signal and/or the ring signal may include specific information and/or data that may be configured to enable the electronic device 200 to identify settings or preferences of the user or the stylus 100. Such information is usually referred to as "stylus setting" information in this specification.

The coordination engine 230 may forward the stylus setting information (if the stylus setting information can be detected and/or can be restored) to the processor 210. If the stylus setting information cannot be restored from the tip signal and/or the ring signal, the coordination engine 230 may optionally indicate to the processor 210 that the stylus setting information is not available. The electronic device 200 can use the stylus setting information in any proper manner (or a case in which the information does not exist), including but not limited to: applying settings to the electronic device, applying settings to a program running on the electronic device, changing a line thickness, a color, and a pattern presented by a graphical program on the electronic device, changing settings of a video game operated on the electronic device, and the like.

Usually, the processor 210 may be configured to: perform, coordinate, and/or manage functions of the electronic device 200. Such functions may include but are not limited to: communicating with and/or transacting data with another subsystem of the electronic device 200, communicating with and/or transacting data with the stylus 100, performing data communication and/or transacting data through a wireless interface, performing data communication and/or transacting data through a wired interface, facilitating power exchange through a wireless (for example, inductive or resonant) or wired interface, receiving one or more locations and angular locations of one or more styluses, and the like.

The processor 210 may be implemented as any electronic device that can process, receive, or send data or instructions. For example, the processor may be a microprocessor, a central processing unit, an application-specific integrated circuit, a field programmable gate array, a digital signal processor, an analog circuit, a digital circuit, or a combination of these devices. The processor may be a single-threaded processor or a multi-threaded processor. The processor may be a single-core processor or a multi-core processor.

During use, the processor 210 may be configured to access a memory that stores instructions. The instructions may be configured to enable the processor to perform, coordinate, or monitor one or more operations or functions of the electronic device 200.

The instructions stored in the memory may be configured to: control or coordinate an operation of another component of the electronic device 200. The component includes but is not limited to: another processor, an analog or digital circuit, a volatile or non-volatile memory module, a display, a speaker, a microphone, a rotary input device, a button or another physical input device, a biometric authentication sensor and/or system, a force or touch input/output component, a communications module (for example, a wireless interface and/or a power connector), and/or a tactile feedback device.

The memory may further store electronic data that can be used by the stylus or the processor. For example, the memory may store electronic data or content (such as a media file, a document, and an application), device settings and preferences, a timing signal and a control signal, data, data structures, or databases used for various modules, a file or a configuration related to detection of a tip signal and/or a ring signal, and the like. The memory may be configured as any type of memory. For example, the memory may be implemented as a random access memory, a read-only memory, a flash memory, a removable memory, another type of storage element, or a combination of these devices.

The electronic device 200 further includes the power subsystem 240. The power subsystem 240 may include a battery or another power supply. The power subsystem 240 may be configured to provide power to the electronic device 200. The power subsystem 240 may be further coupled to the power connector 250. The power connector 250 may be any proper connector or port, and may be configured to receive power from an external power supply and/or configured to provide power to an external load. For example, in some implementation solutions, the power connector 250 may be configured to recharge a battery in the power subsystem 240. In another implementation solution, the power connector 250 may be configured to transmit power stored in (or available to) the power subsystem 240 to the stylus 100.

The electronic device 200 further includes the wireless interface 260 to facilitate electronic communication between the electronic device 200 and the stylus 100. In an implementation solution, the electronic device 200 may be configured to communicate with the stylus 100 through a low energy Bluetooth communication interface or a near field communication interface. In another example, the communication interface facilitates electronic communication between the electronic device 200 and an external communication network, a device, or a platform.

The wireless interface 260 (whether a communication interface between the electronic device 200 and the stylus 100 or another communication interface) may be implemented as one or more wireless interfaces, a Bluetooth interface, a near field communication interface, a magnetic interface, a universal serial bus interface, an inductance interface, a resonant interface, a capacitive coupling interface, a Wi-Fi interface, a TCP/IP interface, a network communication interface, an optical interface, an acoustic interface, or any conventional communication interface.

The electronic device 200 further includes the display 270. The display 270 may be located behind the input surface 220, or may be integrated with the input surface 220. The display 270 may be communicatively coupled to the processor 210. The processor 210 may present information to a user through the display 270. In many cases, the processor 210 presents, through the display 270, an interface with which a user can interact. In many cases, the user manipulates the stylus 100 to interact with an interface.

It is appreciated by a person skilled in the art that some of the foregoing specific details presented by the electronic device 200 may not be required to practice the particular described implementation solutions or equivalents thereof. Similarly, another electronic device may include more subsystems, modules, components, and the like. In a proper case, some submodules may be implemented as software or hardware. Therefore, it should be understood that the foregoing descriptions are not intended to be exhaustive or to limit the disclosure to the exact form described in this specification. On the contrary, it is appreciated by a person of ordinary skill in the art that many modifications and variations are possible based on the foregoing teachings.

Figure 8:
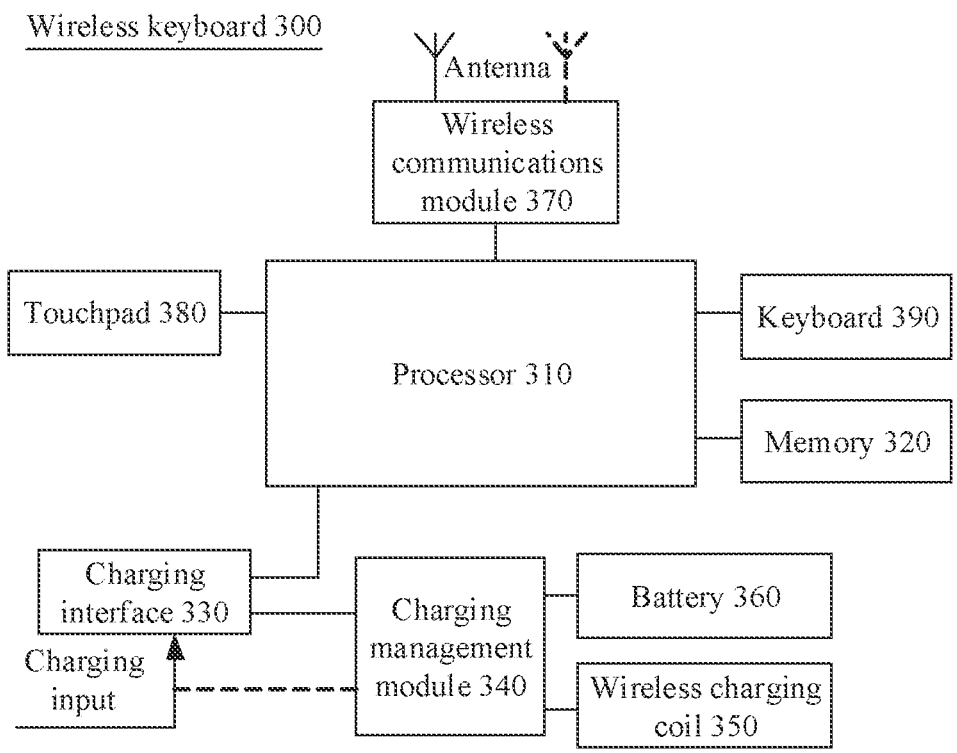
FIG. 8 is a schematic diagram of a hardware structure of a wireless keyboard according to an embodiment of this application.

FIG. 8 is a schematic diagram of a hardware structure of a wireless keyboard according to an embodiment of this application. Refer to FIG. 8. The wireless keyboard 300 may include a processor 310, a memory 320, a charging interface 330, a charging management module 340, a wireless charging coil 350, a battery 360, a wireless communications module 370, a touchpad 380, and a keyboard 390.

The processor 310, the memory 320, the charging interface 330, the charging management module 340, the battery 360, the wireless communications module 370, the touchpad 380, the keyboard 390, and the like may all be disposed on a keyboard body (that is, the second portion 302 shown in FIG. 1) of the wireless keyboard 300. The wireless charging coil 350 may be disposed in the connecting portion 304 (shown in FIG. 4) for movably connecting the keyboard body and a support. It may be understood that the structure shown in this embodiment does not constitute a specific limitation on the wireless keyboard 300. In some other embodiments, the wireless keyboard 300 may include more or fewer components than those shown in the figure, or combine some components, or split some components, or have different component arrangements. The components shown in the figure may be implemented in hardware, software, or a combination of software and hardware.

The memory 320 may be configured to store program code, for example, program code used to wirelessly charge the stylus 100. The memory 320 may further store a Bluetooth address for uniquely identifying the wireless keyboard 300. In addition, the memory 320 may further store connection data of an electronic device successfully paired with the wireless keyboard 300. For example, the connection data may be a Bluetooth address of the electronic device successfully paired with the wireless keyboard 300. Based on the connection data, the wireless keyboard 300 can be automatically paired with the electronic device without configuring a connection between the wireless keyboard 300 and the electronic device, for example, performing validity verification. The Bluetooth address may be a media access control (MAC) address.

The processor 310 may be configured to: execute the application code, and invoke related modules to implement functions of the wireless keyboard 300 in this embodiment of this application, for example, implement a wired charging function, a reverse wireless charging function, a wireless communication function, and the like of the wireless keyboard 300. The processor 310 may include one or more processing units, and different processing units may be independent devices, or may be integrated into one or more processors 310. The processor 310 may be specifically an integrated control chip, or may include a circuit including various active and/or passive components, and the circuit is configured to perform functions of the processor 310 described in this embodiment of this application. The processor of the wireless keyboard 300 may be a microprocessor.

The wireless communications module 370 may be configured to support data exchange between the wireless keyboard 300 and another electronic device including wireless communication such as Bluetooth (BT), a global navigation satellite system (GNSS), a wireless local area network (WLAN) (for example, a wireless fidelity (Wi-Fi) network), frequency modulation (FM), near field communication (NFC), and an infrared (IR) technology.

In some embodiments, the wireless communications module 370 may be a Bluetooth chip. The wireless keyboard 300 may be a Bluetooth keyboard. The wireless keyboard 300 may be paired with a Bluetooth chip of another electronic device through the Bluetooth chip and establish a wireless connection, to implement wireless communication between the wireless keyboard 300 and the another electronic device through the wireless connection.

In addition, the wireless communications module 370 may further include an antenna. The wireless communications module 370 receives an electromagnetic wave through the antenna, performs frequency modulation and filtering processing on an electromagnetic wave signal, and sends a processed signal to the processor 310. The wireless communications module 370 may further receive a to-be-sent signal from the processor 310, perform frequency modulation and amplification on the signal, and convert the signal into an electromagnetic wave for radiation through the antenna.

In some embodiments, the wireless keyboard 300 may support wired charging. Specifically, the charging management module 340 may receive a charging input of a wired charger through the charging interface 330.

In some other embodiments, the wireless keyboard 300 may support forward wireless charging. The charging management module 340 may receive a wireless charging input through the wireless charging coil 350 of the wireless keyboard 300. Specifically, the charging management module 340 is connected to the wireless charging coil 350 through a matching circuit. The wireless charging coil 350 may be coupled to the wireless charging coil of the wireless charger to induce an alternating electromagnetic field emitted by the wireless charging coil 350 of the wireless charger and generate an alternating electrical signal. The alternating electrical signal generated by the wireless charging coil 350 is transmitted to the charging management module 340 through the matching circuit, to wirelessly charge the battery 360.

The charging management module 340 may further supply power to the wireless keyboard 300 while charging the battery 360. The charging management module 340 receives an input of the battery 360, and supplies power to the processor 310, the memory 320, an external memory, the wireless communications module 370, and the like. The charging management module 340 may be further configured to monitor parameters such as a battery capacity, a battery cycle count, and a battery health status (such as leakage or impedance) of the battery 360. In some other embodiments, the charging management module 340 may alternatively be disposed in the processor 310.

In some other embodiments, the wireless keyboard 300 may support reverse wireless charging. Specifically, the charging management module 340 may further receive an input of the charging interface 330 or the battery 360, and convert a direct electric signal that is input by the charging interface 330 or the battery 360 into an alternating electric signal. The alternating electric signal is transmitted to the wireless charging coil 350 through a matching circuit. The wireless charging coil 350 may generate an alternating electromagnetic field when receiving the alternating electric signal. A wireless charging coil of another mobile terminal induces the alternating electromagnetic field to perform wireless charging. To be specific, the wireless keyboard 300 may also wirelessly charge the another mobile terminal. In an embodiment, the wireless charging coil 350 may be disposed in the accommodating portion 303 of the wireless keyboard 300, and a wireless charging coil is disposed in the stylus rod 20 of the stylus 100. When the stylus 100 is placed in the accommodating portion 303, the wireless keyboard 300 may charge the stylus 100 through the wireless charging coil 350.

It should be noted that the matching circuit may be integrated into the charging management module 340, and the matching circuit may be independent of the charging management module 340. This is not limited in this embodiment of this application. FIG. 8 is a schematic diagram of a hardware structure of the wireless keyboard 300 by using an example in which the matching circuit may be integrated into the charging management module 340.

The charging interface 330 may be configured to provide a wired connection for charging or communication between the wireless keyboard 300 and another electronic device (for example, a wired charger of the wireless keyboard 300).

A touch sensor is integrated into the touchpad 380. A notebook computer may receive a user control command on the notebook computer through the touchpad 380 and the keyboard 390.

It may be understood that the structure shown in this embodiment of this application does not constitute a specific limitation on the wireless keyboard 300. The wireless keyboard 300 may have more or fewer components than those shown in FIG. 8, may combine two or more components, or may have different component configurations. For example, a housing of the wireless keyboard 300 may also be provided with an accommodating portion for accommodating the stylus 100. The wireless charging coil 350 is disposed in the accommodating portion, and is configured to wirelessly charge the stylus 100 when the stylus 100 is accommodated in the accommodating portion.

For another example, the outer surface of the wireless keyboard 300 may further include components such as a button, an indicator (which may indicate a state such as a battery level, an incoming/outgoing call, and a pairing mode), and a display screen (which may prompt a user with related information). The button may be a physical button, a touch key (used in collaboration with the touch sensor), or the like, and is used to trigger an operation such as power-on, power-off, starting charging, or stopping charging.

However, in the related technology, coupling is likely to occur between a first transmitting electrode 41 and a second transmitting electrode 42, and electromagnetic fields emitted by the first transmitting electrode 41 and the second transmitting electrode 42 interfere with each other. This reduces accuracy of measuring a location and an inclination of the stylus 100 by the electronic device 200. The first transmitting electrode 41 is used as an example. After a first signal transmitted by the first transmitting electrode 41 to the electronic device 200 is interfered with, the electronic device 200 cannot accurately determine a location of the stylus 100 on the touchscreen 201, and therefore an operation of the stylus 100 may be deviated. For example, an application icon tapped by the stylus 100 is not a target application icon of a user, or a line drawn by the stylus 100 is not a target line of a user. This affects accuracy of the stylus 100, and therefore affects use performance of the stylus 100.

Therefore, embodiments of this application provide a stylus and an electronic device component. A first electrode and a second electrode are disposed in the stylus. The first electrode is disposed in a stylus tip, and the second electrode is disposed on an inner wall of a stylus rod, or the second electrode is disposed on a fastener in the stylus rod, so that there is a sufficient distance between the first electrode and the second electrode, to avoid coupling between the first electrode and the second electrode, improve accuracy of detecting a location and an inclination of the stylus by the electronic device, and improve use performance of the stylus. The stylus in embodiments of this application is described in detail below in different embodiments.

Embodiment 1

Figure 9:
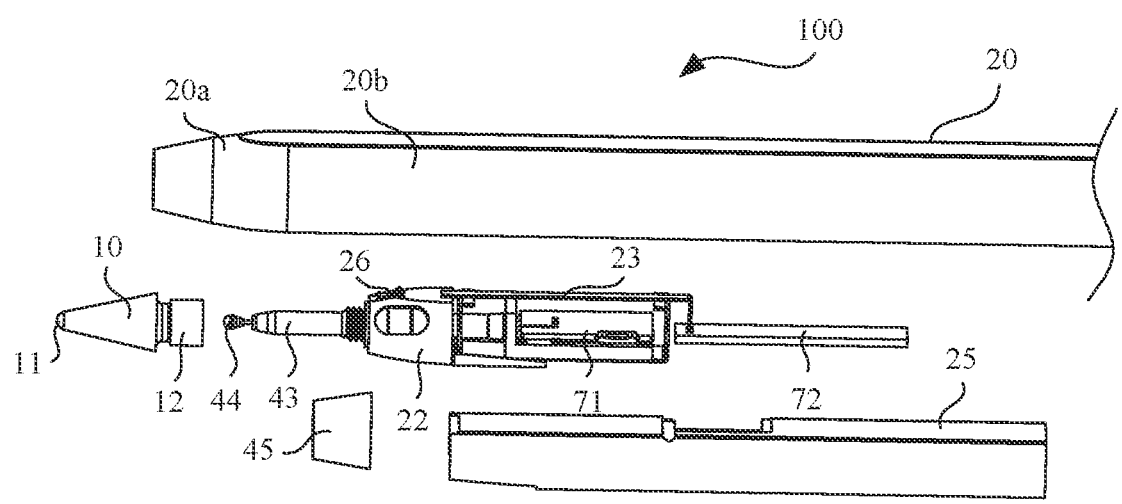
FIG. 9 is a partial exploded view of a first stylus according to Embodiment 1 of this application.
Figure 10:
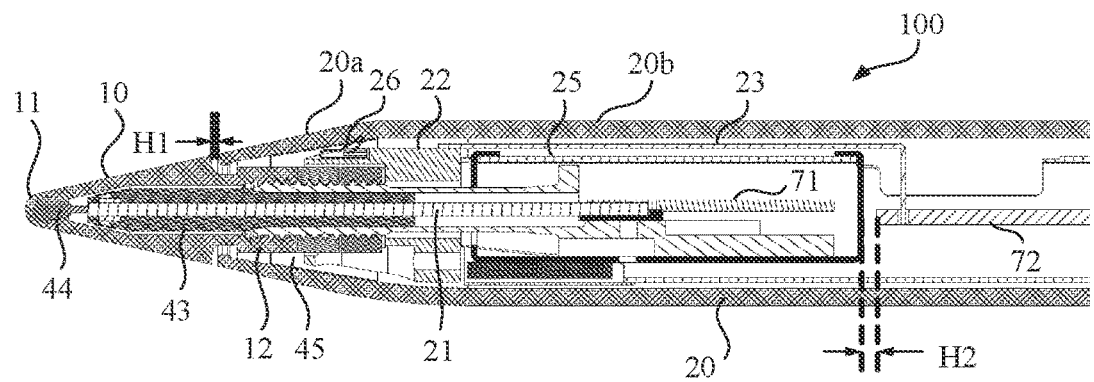
FIG. 10 is a sectional view of the stylus in FIG. 9.

FIG. 9 is a partial exploded view of a first stylus according to an embodiment of this application. FIG. 10 is a sectional view of the stylus in FIG. 9.

Refer to FIG. 9 and FIG. 10. A first electrode 44, a second electrode 45, a first circuit board 71, and a second circuit board 72 are disposed in the stylus 400.

The first electrode 44 may be a transmitting electrode, for example, the first electrode 44 is configured to transmit a first signal to the electronic device 200. The electronic device 200 determines a location of the stylus 400 on the touchscreen 201 based on the first signal transmitted by the first electrode 44. When the first electrode 44 is the transmitting electrode, the first electrode 44 is the first transmitting electrode 41.

The second electrode 45 may also be a transmitting electrode, for example, the second electrode 45 is configured to transmit a second signal to the electronic device. The electronic device determines an inclination angle of the stylus 400 relative to the touchscreen 201 based on the second signal transmitted by the second electrode 45. When the second electrode 45 is the transmitting electrode, the second electrode 45 is the second transmitting electrode 42.

Specifically, the first electrode 44 is connected to the first circuit board 71, and the first circuit board 71 is electrically connected to the second circuit board 72 to control, through the second circuit board 72, the first electrode 44 to transmit a first signal to the electronic device 200. The second electrode 45 is electrically connected to the second circuit board 72 to control, through the second circuit board 72, the second electrode 45 to transmit a second signal to the electronic device 200.

In actual application, the first circuit board 71 may be a control board, for example, a controller is integrated on the first circuit board 71. The second circuit board 72 may be a main board. The second circuit board 72 transmits a signal to the first circuit board 71, and controls, through the first circuit board 71, the first electrode 44 and the second electrode 45 to send a signal to the electronic device 200.

The second circuit board 72 may be connected to the first circuit board 71 through a flexible wire. For example, the flexible wire may be a flexible printed circuit (FPC), a flexible cable, or a flexible power supply line (PIN).

In this embodiment, the first electrode 44 is electrically connected to the second circuit board 72 through the first circuit board 71. The first circuit board 71 may be directly connected to the first electrode 44. Alternatively, the first circuit board 71 is connected to the first electrode 44 through a conductive piece 21, that is, the conductive piece 21 is connected between the first electrode 44 and the first circuit board 71.

Specifically, the conductive piece 21 may be a printed circuit board (PCB) or a metal plate.

In addition, the second electrode 45 may be directly electrically connected to the second circuit board 72 through the flexible wire. Alternatively, the second electrode 45 is electrically connected to the first circuit board 71 through the flexible wire, and is electrically connected to the second circuit board 72 through the first circuit board 71.

As described above, the first signal transmitted by the first electrode 44 to the electronic device 200 is used to measure a location of a stylus tip 10 of the stylus 400 on the touchscreen 201. Therefore, the first electrode 44 may be disposed in the stylus tip 10. In this way, when a user operates the stylus 400 to interact with the electronic device 200, the stylus tip 10 is close to the touchscreen 201 of the electronic device 200, a transmission distance of the first signal transmitted by the first electrode 44 is short, and the location that is of the stylus tip 10 and that is detected by the electronic device 200 is accurate.

The second signal transmitted by the second electrode 45 to the electronic device 200 is used to measure an inclination angle of a stylus rod 20 of the stylus 400 relative to the touchscreen 201. In the related technology, the second electrode 45 is usually disposed in the stylus tip 10 together with the first electrode 44.

However, due to limited space of the stylus tip 10, a distance between the second electrode 45 and the first electrode 44 is usually short. Therefore, coupling is likely to occur between the second electrode 45 and the first electrode 44, and the second signal transmitted by the second electrode 45 and the first signal transmitted by the first electrode 44 interfere with each other, to reduce accuracy of detecting a location and an inclination angle of the stylus 400 by the electronic device 200.

Therefore, in this embodiment of this application, the second electrode 45 is disposed on an inner wall of the stylus rod 20, or the second electrode 45 is disposed on a fastener (for details, refer to a connecting sleeve 22 described below) in the stylus rod 20. For example, refer to FIG. 10. The second electrode 45 may be disposed on the inner wall of the stylus rod 20. In this way, the distance between the second electrode 45 and the first electrode 44 is long, and electromagnetic interference generated between the first signal transmitted by the first electrode 44 and the second signal transmitted by the second electrode 45 is weak, or the first electrode 44 and the second electrode 45 do not interfere with each other. Therefore, accuracy of measuring a location and an inclination angle of the stylus 100 by the electronic device 200 can be improved.

The first electrode 44 is disposed in the stylus tip 10, and the second electrode 45 is disposed on the inner wall of the stylus rod 20, to increase the distance between the second electrode 45 and the first electrode 44, reduce coupling between the first electrode 44 and the second electrode 45, improve accuracy of transmitting the signals by the first electrode 44 and the second electrode 45, improve operation accuracy of the stylus 400, and improve use performance of the stylus 400.

Refer to FIG. 10. One end of the stylus tip 10 of the stylus 400 is a writing end 11 of the stylus tip 10, and the writing end 11 is an end that is of the stylus tip 10 and that is away from the stylus rod 20. When the user operates the stylus 400 to interact with the electronic device 200, the writing end 11 of the stylus tip 10 faces the touchscreen 201 of the electronic device 200, and an operation of the stylus 400 on the touchscreen 201 is implemented through contact between the writing end 11 of the stylus tip 10 and the touchscreen 201.

For example, the writing end 11 of the stylus tip 10 single-taps or double-taps an icon of an application on the touchscreen 201 to invoke a corresponding application. Alternatively, the writing end 11 of the stylus 400 draws a line on the touchscreen 201 to write or draw on the touchscreen 201.

The other end that is of the stylus tip 10 and that is opposite to the writing end 11 is a connecting end 12 of the stylus tip 10, and the stylus tip 10 is connected to an external screw thread 51 (for details, refer to FIG. 2B) of the spindle component 50 in the stylus rod 20.

It should be noted that there is a gap H1 between the stylus tip 10 and the stylus rod 20. In this way, when the user operates the stylus 100, the stylus tip 10 is subjected to pressure from the touchscreen 201. In this case, the stylus tip 10 can move slightly toward the stylus rod 20, and the stylus 400 adjusts a writing line thickness of the stylus tip 10 by detecting a force of the stylus 10.

For example, the stylus tip 10 and the stylus rod 20 may be connected through magnetic adsorption. For example, a magnetic piece is disposed in the stylus tip 10, a magnetic piece is disposed in the stylus rod 20, and there is magnetic attraction between the magnetic piece in the stylus tip 10 and the magnetic piece in the stylus rod 20. In this case, when the stylus tip 10 is subjected to a force to change, the magnetic attraction between the stylus tip 10 and the stylus rod 20 changes to implement movement of the stylus tip 10 relative to the stylus rod 20.

Refer to FIG. 10. To improve accuracy of detecting a location of the stylus tip 10 of the stylus 100 by the electronic device 200, the first electrode 44 may be disposed at the writing end 11 of the stylus tip 10. In this way, when the user operates the stylus 400, the writing end 11 of the stylus 400 faces the touchscreen 201 and contacts the touchscreen 201, a distance between the first electrode 44 located at the writing end 11 and the touchscreen 201 is short, strength of a first signal transmitted by the first electrode 44 to the electronic device 200 is higher, and a location that is of the stylus tip 10 of the stylus 400 and that is detected by the electronic device 200 is more accurate.

As described above, in this embodiment, the second electrode 45 is disposed on an inner wall of the stylus rod 20, to increase a distance between the second electrode 45 and the first electrode 44, reduce coupling between the second electrode 45 and the first electrode 44, and improve accuracy of measuring a location and an inclination angle of the stylus 100. However, when the stylus 400 interacts with the electronic device 200, if a distance between the second electrode 45 and the touchscreen 201 is too long, strength of a second signal that is transmitted by the second electrode 45 and that is received by the electronic device 200 is correspondingly reduced. This may reduce accuracy of detecting an inclination angle of the stylus 100 by the electronic device 200.

Therefore, in this embodiment, the second electrode 45 may be disposed in a part that is in the stylus rod 20 and that is close to the stylus tip 10. Therefore, the second electrode 45 is located in the stylus rod 20. This ensures that there is a sufficient distance between the second electrode 45 and the first electrode 44, and can reduce coupling between the second electrode 45 and the first electrode 44. In addition, a distance between the second electrode 45 and the stylus tip 10 is proper. When the stylus 400 interacts with the electronic device 200, this can ensure that the second signal that is transmitted by the second electrode 45 and that is received by the electronic device 200 has sufficient strength, and can further ensure accuracy of measuring an inclination angle of the stylus 100 by the electronic device 200.

For a specific manner of disposing the first circuit board 71 and the second circuit board 72 in the stylus 400, refer to FIG. 10. In some embodiments, the first circuit board 71 and the second circuit board 72 may be disposed along an axial direction of the stylus 400 based on a feature of a structure in which the stylus 400 is in a long rod shape as a whole.

Specifically, for example, the first circuit board 71 is directly connected to the first electrode 44 in the writing end 11 of the stylus tip 10. One end of the first circuit board 71 is connected to the first electrode 44, and the other end of the first circuit board 71 protrudes toward the stylus rod 20 away from the stylus tip 10 along the axial direction of the stylus 400.

For example, the first circuit board 71 is connected to the first electrode 44 through the conductive piece 21 such as a PCB or a metal plate. One end of the conductive piece 21 is connected to the first electrode 44, and the conductive piece 21 extends along the axial direction of the stylus 400. One end of the first circuit board 71 is connected to the other end of the conductive piece 21, and the other end of the first circuit board 71 protrudes toward the stylus rod 20 away from the stylus tip 10 along the axial direction of the stylus 400.

The second circuit board 72 may be alternately disposed on a side that is of the first circuit board 71 and that is away from the first electrode 44, and the second circuit board 72 may be disposed on an axis of the stylus rod 20, or the second circuit board 72 may be disposed off an axis of the stylus rod 20.

In actual application, a receiving electrode (not shown) is also usually disposed in the stylus 400. The receiving electrode is configured to: receive a signal transmitted by the electronic device 200 to the stylus 400, and control, through the second circuit board 72, the stylus 400 to execute a command sent by the electronic device 200.

The receiving electrode is electrically connected to the second circuit board 72 through a flexible wire. Alternatively, the receiving electrode is electrically connected to the first circuit board 71 through a flexible wire, and then is electrically connected to the second circuit board 72 through the first circuit board 71.

Specifically, the receiving electrode may be independently disposed, that is, the receiving electrode is further disposed in the stylus 400 in addition to the first electrode 44 and the second electrode 45. Alternatively, the receiving electrode may be integrally disposed with one of the first electrode 44 and the second electrode 45 as a transmitting electrode. For example, the receiving electrode and the first electrode 44 may be integrated, or the receiving electrode and the second electrode 45 may be integrated.

It should be understood that because signal transmission directions of the receiving electrode and the transmitting electrode are opposite, the receiving electrode and the transmitting electrode are integrally disposed, and performance of the receiving electrode and the transmitting electrode is not affected.

In some embodiments, the receiving electrode is independently disposed, and the receiving electrode may be disposed between the first electrode 44 and the second electrode 45, or the receiving electrode may be disposed on a side that is of the second electrode 45 and that is away from the first electrode 44.

In some other embodiments, the receiving electrode may be integrally disposed on the first electrode 44. Alternatively, the receiving electrode may be integrally disposed on the second electrode 45. Because the first electrode 44 is disposed at the writing end 11 of the stylus tip 10, and space of the writing end 11 of the stylus tip 10 is limited, it is inconvenient to integrally dispose the receiving electrode and the first electrode, and therefore the receiving electrode may be integrally disposed with the second electrode 45.

When the receiving electrode and the second electrode 45 are integrally disposed, the second electrode 45 may include a signal transmitting module (not shown in the figure) and a signal receiving module (not shown in the figure). The signal transmitting module is configured to transmit a second signal to the electronic device 200, and the electronic device 200 determines an inclination angle of the stylus 400 based on the second signal transmitted by the signal transmitting module of the second electrode 45. The signal receiving module of the second electrode 45 is configured to receive a signal transmitted by the electronic device 200 to the stylus 400, and the second circuit board 72 of the stylus 400 controls, through the signal received by the signal receiving module of the second electrode 45, the stylus 400 to execute a command sent by the electronic device 200.

Refer to FIG. 10, to improve accuracy of detecting a location and an inclination angle of the stylus 100, in an implementation, a ground electrode 43 may be disposed between the first electrode 44 and the second electrode 45, and the ground electrode 43 is electrically connected to the second circuit board 72. The ground electrode 43 is used to reduce signal interference between the first electrode 44 and the second electrode 45, and reduce or avoid coupling between the first electrode 44 and the second electrode 45.

The ground electrode 43 may be directly electrically connected to the second circuit board 72 through a flexible wire. Alternatively, the ground electrode 43 is connected to the first circuit board 71 through a flexible wire, and is electrically connected to the second circuit board 72 through the first circuit board 71.

Based on locations of the first electrode 44 and the second electrode 45 in the stylus 400, in this embodiment, when the first circuit board 71 is directly connected to the first electrode 44, the ground electrode 43 may be sleeved outside a part that is of the first circuit board 71 and that is close to the first electrode 44. When the conductive piece 21 is connected between the first circuit board 71 and the first electrode 44, the ground electrode 43 may be sleeved outside the conductive piece 21.

It should be noted that when both the ground electrode 43 and the first electrode 44 are electrically connected to the first circuit board 71 through the conductive piece 21, the conductive piece 21 may be a multilayer circuit board. In this way, the conductive piece 21 may respectively provide two mutually independent transmission paths to electrically connect the first circuit board 71 to the ground electrode 43 and the first electrode 44 respectively.

Specifically, refer to FIG. 9. In this embodiment, the stylus rod 20 may include a tapered cylinder section 20a and a straight cylinder section 20b along an axis direction of the stylus rod 20, the tapered cylinder section 20a is close to the stylus tip 10, and the connecting end 12 of the stylus tip 10 is connected to the tapered cylinder section 20a of the stylus rod 20.

In actual application, the stylus tip 10 of the stylus 400 may be usually in a shape of a cone, the top of the cone is the writing end 11 of the stylus tip 10, and the bottom of the cone is connected to the tapered cylinder section 20a of the stylus rod 20. The tapered cylinder section 20a of the stylus rod 20 may match the bottom of the stylus tip 10 in the shape of the cone, and smooth transition is performed between the bottom of the stylus tip 10 and an end that is of the tapered cylinder section 20a of the stylus rod 20 and that is connected to the stylus tip 10.

To ensure accuracy of detecting an inclination angle of the stylus 100, in this embodiment, the second electrode 45 may be disposed on an inner wall of the tapered cylinder section 20a of the stylus rod 20. In this way, when the stylus 400 interacts with the electronic device 200, a distance between the second electrode 45 in the tapered cylinder section 20a of the stylus rod 20 and the electronic device 200 is short, strength of a second signal that is transmitted by the second electrode 45 and that is received by the electronic device 200 is high, and accuracy of an inclination angle that is of the stylus 100 and that is detected by the electronic device 200 is more accurate.

Refer to FIG. 9 and FIG. 10. The fastener in the stylus 400 in this embodiment may be a connecting sleeve 22, the connecting sleeve 22 is fastened to the stylus rod 20, and the connecting sleeve 22 is located at an end that is in the stylus rod 20 and that is close to the stylus tip 10. The connecting end 12 of the stylus tip 10 extends into the connecting sleeve 22, and is movably connected to the connecting sleeve 22.

Specifically, the connecting sleeve 22 may be fastened to an inner wall of the stylus rod 20. For example, the connecting sleeve 22 may be fastened to the inner wall of the stylus rod 20 through adhesion, welding, locking, or snapping.

The connecting sleeve 22 may be disposed along the axis direction of the stylus rod 20, and at least part of the connecting sleeve 22 is located in the tapered cylinder section 20a of the stylus rod 20. For example, the connecting sleeve 22 is completely located in the tapered cylinder section 20a of the stylus rod 20. Alternatively, a partial structure of the connecting sleeve 22 is located in the tapered cylinder section 20a of the stylus rod 20, and another partial structure of the connecting sleeve 22 is located in the straight cylinder section 20b of the stylus rod 20.

For a specific manner of disposing the second electrode 45 in the stylus rod 20, refer to FIG. 9 and FIG. 10. In a specific implementation, the second electrode 45 may be attached to the inner wall of the stylus rod 20, for example, the second electrode 45 is attached to an inner wall of the tapered cylinder section 20a of the stylus rod 20.

For example, the second electrode 45 may be injection-molded on the inner wall of the tapered cylinder section 20a of the stylus rod 20 through injection molding. Alternatively, the second electrode 45 is adhered to the inner wall of the tapered cylinder section 20a of the stylus rod 20. Alternatively, the second electrode 45 is clamped on the inner wall of the tapered cylinder section 20a of the stylus rod 20. Alternatively, the second electrode 45 may be fastened to the inner wall of the tapered cylinder section 20a of the stylus rod 20 in another connection manner. This is not specifically limited in this embodiment.

In actual application, a housing of the stylus 400 is usually made of a non-conductive material. For example, the stylus rod 20 of the stylus 400 is a plastic stylus rod 20. To implement a connection between the second electrode 45 on the inner wall of the stylus rod 20 and the first circuit board 71 or the second circuit board 72, in some implementations, a flexible electrical connecting piece 23 may be connected between the second electrode 45 and the first circuit board 71, or a flexible electrical connecting piece 23 may be connected between the second electrode 45 and the second circuit board 72, to implement a connection between the second electrode 45 and the second circuit board 72 as a main board through the flexible electrical connecting piece 23.

The flexible electrical connecting piece 23 may be disposed along the inner wall of the stylus rod 20, one end of the flexible electrical connecting piece 23 is connected to the second electrode 45 attached to the inner wall of the stylus rod 20, and the other end of the flexible electrical connecting piece 23 extends to the first circuit board 71 or the second circuit board 72 and is connected to the first circuit board 71 or the second circuit board 72.

For example, the flexible electrical connecting piece 23 may be a flexible wire such as an FPC, a flexible cable, or a flexible power supply line. It should be noted that the flexible electrical connecting piece 23 mentioned below may be the flexible wire. Details are not described again.

In some other implementations, the connecting sleeve 22 disposed in the stylus rod 20 is a conductive sleeve. For example, the connecting sleeve 22 may be a metal sleeve, and the second electrode 45 attached to the inner wall of the stylus rod 20 may be electrically connected to the first circuit board 71 or the second circuit board 72 through the connecting sleeve 22.

Specifically, the second electrode 45 may be in contact with the conductive connecting sleeve 22, and the connecting sleeve 22 is electrically connected to the first circuit board 71 or the second circuit board 72, so that the second electrode 45 is electrically connected to the first circuit board 71 or the second electrode 45 is electrically connected to the second circuit board 72. The second electrode 45 may be in direct or indirect contact with the connecting sleeve 22.

In a specific implementation, a conductive spring 26 may be disposed on an outer wall of the connecting sleeve 22, for example, the conductive spring 26 is disposed on an outer wall that is of the connecting sleeve 22 and that faces one end of the stylus tip 10. The second electrode 45 is in contact with the conductive spring 26, and the flexible electrical connecting piece 23 is connected between the outer wall of the connecting sleeve 22 and the first circuit board 71, or the flexible electrical connecting piece 23 is connected between the outer wall of the connecting sleeve 22 and the second circuit board 72.

Refer to FIG. 10. The conductive spring 26 is disposed on the outer wall of the connecting sleeve 22, and the second electrode 45 on the inner wall of the stylus rod 20 is in contact with the conductive spring 26, to connect the second electrode 45 to the connecting sleeve 22 through the conductive spring 26.

Because the conductive spring 26 has elasticity, the conductive spring 26 is elastically deformed to enable the second electrode 45 to be in good contact with the conductive spring 26, to ensure stability of the electrical connection between the second electrode 45 and the connecting sleeve 22.

Based on a fact that the second electrode 45 is electrically connected to the connecting sleeve 22 through the conductive spring 26, the flexible electrical connecting piece 23 is further connected to the outer wall of the connecting sleeve 22, one end of the flexible electrical connecting piece 23 is connected to the outer wall of the connecting sleeve 22, and the other end of the flexible electrical connecting piece 23 is connected to the first circuit board 71 or the second circuit board 72, so that the second electrode 45 is electrically connected to the first circuit board 71 or the second circuit board 72.

Embodiment 2

Figure 11:
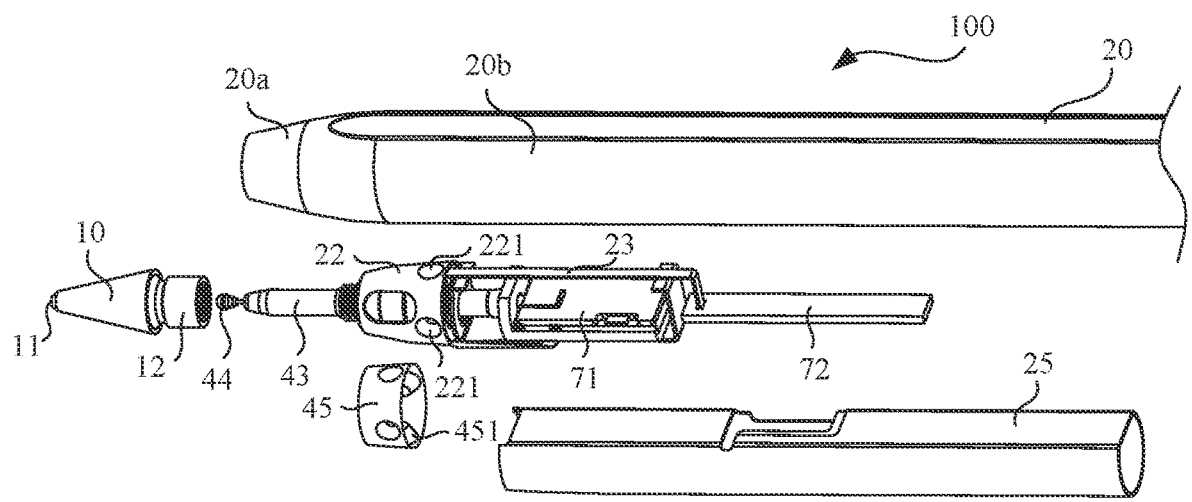
FIG. 11 is a partial exploded view of a second stylus according to Embodiment 2 of this application.
Figure 12:
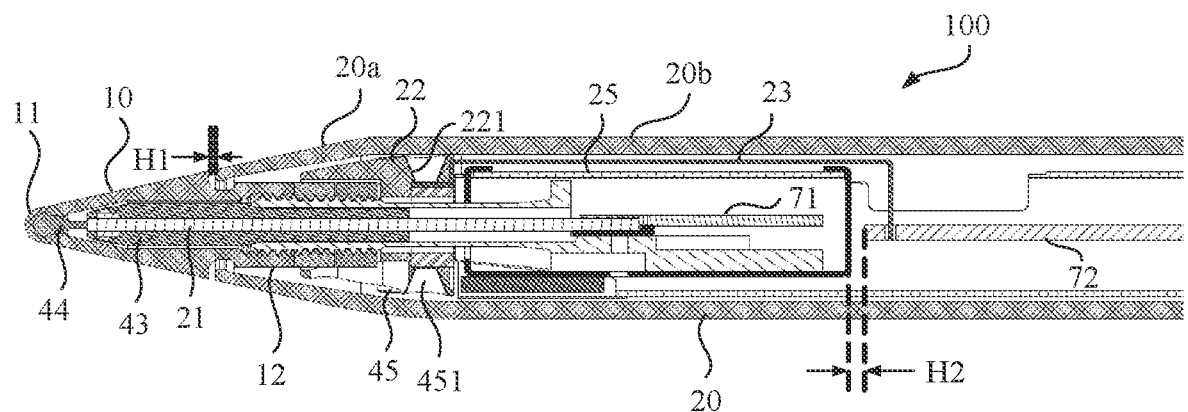
FIG. 12 is a sectional view of the stylus in FIG. 11.

FIG. 11 is a partial exploded view of a second stylus according to Embodiment 2 of this application. FIG. 12 is a sectional view of the stylus in FIG. 11. Refer to FIG. 11 and FIG. 12. Different from Embodiment 1, in this embodiment, a second electrode 45 may be disposed on a connecting sleeve 22. The second electrode 45 may be electrically connected to the first circuit board 71 or the second circuit board 72, or the second electrode 45 is electrically connected to the first circuit board 71 or the second circuit board 72 through the connecting sleeve 22.

Refer to FIG. 11 and FIG. 12. An accommodating groove 221 may be disposed on an outer wall of the connecting sleeve 22, a protruding part 451 fitting the accommodating groove 221 is disposed on the second electrode 45, and the second electrode 45 is disposed on the outer wall of the connecting sleeve 22 through fitting between the protruding part 451 and the accommodating groove 221. In this way, when the stylus 400 is assembled, the second electrode 45 may be first mounted on the connecting sleeve 22, and then the connecting sleeve 22 may be fastened to the stylus rod 20.

Through fitting between the protruding part 451 on the second electrode 45 and the accommodating groove 221, rotation of the second electrode 45 on the outer wall of the connecting sleeve 22 is avoided, the second electrode 45 on the connecting sleeve 22 is limited, and component of the second electrode 45 on the connecting sleeve 22 is facilitated.

Specifically, in some implementations, to facilitate a connection between the second electrode 45 and the connecting sleeve 22, the second electrode 45 may be disposed in an annular structure, and a size of the annular second electrode 45 matches a size of the connecting sleeve 22, so that the annular second electrode 45 can be directly sleeved on the outer wall of the connecting sleeve 22. In some other implementations, the second electrode 45 may alternatively be in a sheet-like structure or another structure, and the second electrode 45 is disposed in the accommodating groove 221 on the connecting sleeve 22.

For example, the second electrode 45 is in an annular structure. One accommodating groove 221 may be disposed on the connecting sleeve 22, and a protruding part 451 that is on the second electrode 45 and that corresponds to the accommodating groove 221 extends into the accommodating groove 221. Alternatively, a plurality of accommodating grooves 221 may be alternately disposed on the connecting sleeve 22 along a circumferential direction of the connecting sleeve 22, and protruding parts 451 on the second electrode 45 that correspond to the accommodating grooves 221 are snapped into the accommodating grooves 221. In this way, stability of the connection between the second electrode 45 and the connecting sleeve 22 can be improved.

Alternatively, the accommodating groove 221 may be an annular groove disposed along a circumferential direction of the connecting sleeve 22. An annular groove is processed on the outer wall of the connecting sleeve 22 and is used as the accommodating groove 221. In this way, processing of the accommodating groove 221 is facilitated, and the second electrode 45 is mounted in the accommodating groove 221.

Therefore, the second electrode 45 may be disposed in an annular structure matching the annular accommodating groove 221, and the entire second electrode 45 is snapped into the accommodating groove 221, so that stability of the connection between the second electrode 45 and the accommodating groove 221 can be improved. Alternatively, the second electrode 45 is in a sheet-like structure, and the second electrode 45 is located only at a location in the annular accommodating groove 221. In this case, the second electrode 45 may be mounted at any location in the annular accommodating groove 221.

In view this, the connecting sleeve 22 may be a conductive metal sleeve, and the second electrode 45 is connected to the connecting sleeve 22. In addition, the outer wall of the connecting sleeve 22 is connected to the first circuit board 71 through the flexible electrical connecting piece 23, or the outer wall of the connecting sleeve 22 is connected to the second circuit board 72 through the flexible electrical connecting piece 23, so that the second electrode 45 is electrically connected to the first circuit board 71 or the second circuit board 72 through the conductive connecting sleeve 22.

Alternatively, the connecting sleeve 22 is non-conductive, for example, the connecting sleeve 22 is a plastic sleeve. The second electrode 45 is electrically connected to the first circuit board 71 or the second circuit board 72 directly through the flexible electrical connecting piece 23. Specifically, one end of the flexible electrical connecting piece 23 extends into the accommodating groove 221 to be in contact with the second electrode 45, and the other end of the flexible electrical connecting piece 23 is connected to the first circuit board 71 or the second circuit board 72.

One end that is of the flexible electrical connecting piece 23 and that is connected to the second electrode 45 can extend to the groove bottom of the accommodating groove 221, that is, the flexible electrical connecting piece 23 is connected to a surface of a side that is of the second electrode 45 and that faces the groove bottom of the accommodating groove 221. In this way, the accommodating groove 221 can fasten and limit the flexible electrical connecting piece 23, and can improve stability of the connection between the second electrode 45 and the flexible electrical connecting piece 23.

It should be noted that, in this embodiment, the accommodating groove 221 may be a concave area disposed inward from the outer wall of the connecting sleeve 22, and the flexible electrical connecting piece 23 may extend into the accommodating groove 221 along a surface of the outer wall of the connecting sleeve 22 to be connected to the second electrode 45. Alternatively, the accommodating groove 221 may be a through hole penetrating both sides of the connecting sleeve 22. Based on this, the flexible electrical connecting piece 23 may directly extend from an inner wall of the connecting sleeve 22 to a part in which the accommodating groove 221 is located.

Embodiment 3

Figure 13:
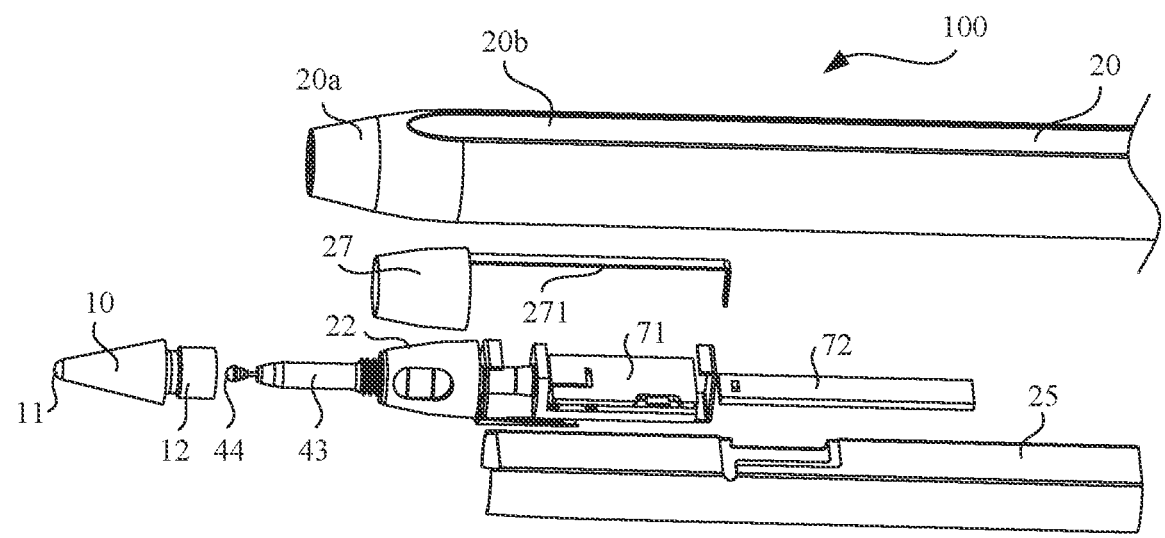
FIG. 13 is a partial exploded view of a third stylus according to Embodiment 3 of this application.
Figure 14:
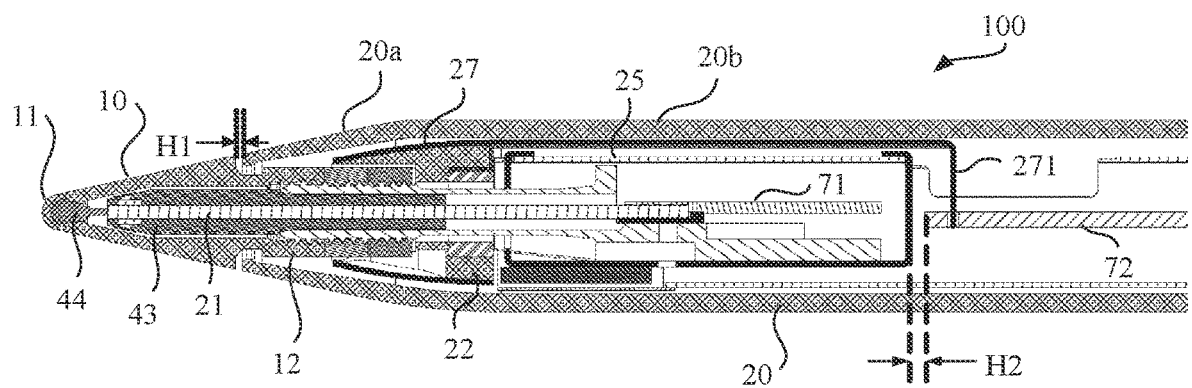
FIG. 14 is a sectional view of the stylus in FIG. 13.

FIG. 13 is a partial exploded view of a third stylus according to Embodiment 3 of this application. FIG. 14 is a sectional view of the stylus in FIG. 13. Refer to FIG. 13 and FIG. 14. In addition to a form in which an accommodating groove 221 is disposed on an outer wall of a connecting sleeve 22 to mount a second electrode 45, there may be a form in which the second electrode 45 is set to be integrated on a flexible circuit board 27. The flexible circuit board 27 is electrically connected to a first circuit board 71 or a second circuit board 72, so that the second electrode 45 is electrically connected to the first circuit board 71 or the second circuit board 72.

It should be noted that because a thickness of the flexible circuit board 27 is small, the accommodating groove 221 may not need to be disposed in the connecting sleeve 22, but the flexible circuit board 27 integrated with the second electrode 45 is directly attached to an outer wall of the connecting sleeve 22.

Alternatively, the accommodating groove 221 may be disposed in the connecting sleeve 22, so that a portion that is of the flexible circuit board 27 and that corresponds to the accommodating groove 221 is snapped into the accommodating groove 221, to improve stability of a connection between the flexible circuit board 27 and the connecting sleeve 22.

Specifically, in an implementation, the flexible circuit board 27 integrated with the second electrode 45 is directly connected to the first circuit board 71 or the second circuit board 72. Refer to FIG. 13 and FIG. 14. The flexible circuit board 27 is attached to the outer wall of the connecting sleeve 22, and a pin 271 protrudes from a side of the flexible circuit board 27. For example, the pin 271 protrudes from a side that is of the flexible circuit board 27 and that faces the first circuit board 71 or the second circuit board 72, and the pin 271 extends to be connected to the first circuit board 71 or the second circuit board 72.

In another implementation, for the conductive connecting sleeve 22, the flexible circuit board 27 integrated with the second electrode 45 may be attached to the outer wall of the connecting sleeve 22 through a conductive adhesive, so that the flexible circuit board 27 and the connecting sleeve 22 can be connected to each other.

Then, the flexible electrical connecting piece 23 is connected between the outer wall of the connecting sleeve 22 and the first circuit board 71, or the flexible electrical connecting piece 23 is connected between the outer wall of the connecting sleeve 22 and the second circuit board 72, and the flexible circuit board 27 integrated with the second electrode 45 is connected to the first circuit board 71 or the second circuit board 72.

Embodiment 4

Figure 15:
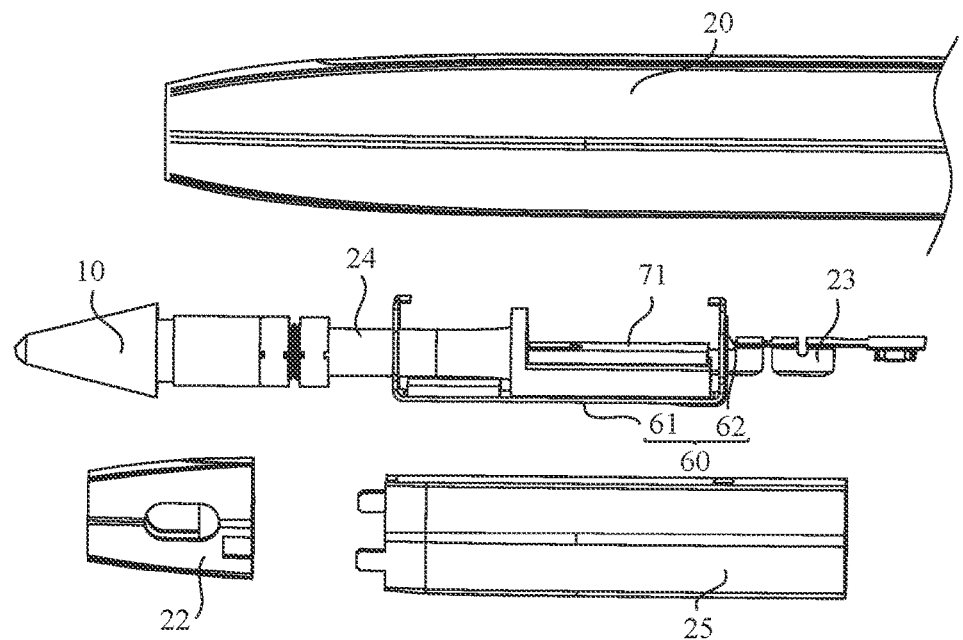
FIG. 15 is a partial exploded view of a fourth stylus according to Embodiment 4 of this application.
Figure 16:
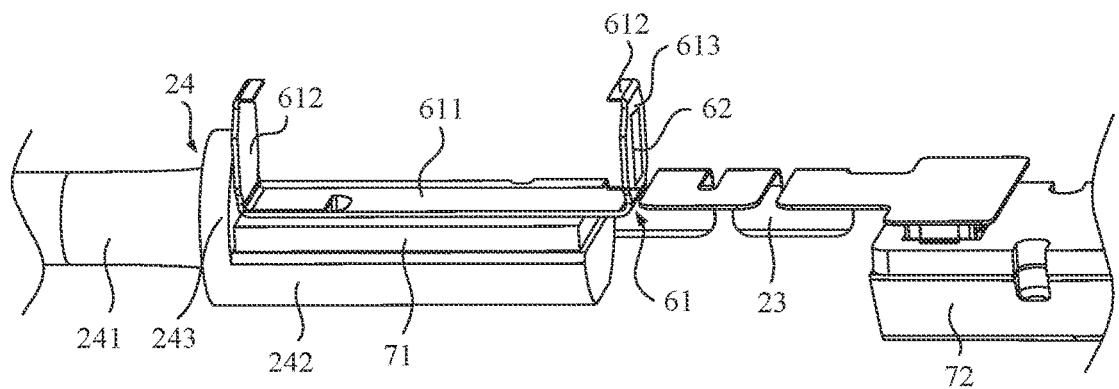
FIG. 16 is a diagram of a partial structure of a fifth stylus according to Embodiment 5 of this application.

FIG. 15 is a partial exploded view of a fourth stylus according to Embodiment 4 of this application. FIG. 16 is a diagram of a partial structure of a fifth stylus according to Embodiment 5 of this application.

Refer to FIG. 15. A spindle component 50 and a pressure sensing component 60 are further disposed in the stylus 400. The pressure sensing component 60 includes a swing piece 61 and a strain gauge 62. The spindle component 50 (for details, refer to FIG. 2B) includes at least a force transmission shaft 24, one end of the force transmission shaft 24 is connected to a connecting end 12 (for details, refer to FIG. 13) of the stylus tip 10, the other end of the force transmission shaft 24 is connected to the swing piece 61, the strain gauge 62 is attached to one end that is of the swing piece 61 and that faces the second circuit board 72, and the strain gauge 62 is electrically connected to the first circuit board 71 or the second circuit board 72.

With reference to FIG. 14, there is a gap H1 between external connection portions of the stylus tip 10 and the stylus rod 20. The gap H1 enables the stylus tip 10 to move slightly relative to the stylus rod 20. When the stylus tip 10 of the stylus 400 contacts a touchscreen 201 of the electronic device 200, the stylus tip 10 is subjected to a force, and the gap H1 enables the stylus tip 10 to move toward the stylus rod 20 when being subjected to a force.

Movement of the stylus tip 10 drives the force transmission shaft 24 to move, and the force transmission shaft 24 drives the swing piece 61 to swing. The swing piece 61 is an elastic piece. The swing piece 61 may generate a swing at a corresponding amplitude based on a magnitude of a force applied to the stylus tip 10. The strain gauge 62 is configured to: detect an elastic force generated when the swing piece 61 swings, and transmit the elastic force to the second circuit board 72 in a form of a signal. The second circuit board 72 adjusts a writing thickness of the stylus tip 10 based on the elastic force. The strain gauge 62 may be connected to the first circuit board 71 through a flexible wire, and a strain force signal measured by the strain gauge 62 may be transmitted to the second circuit board 72 through the first circuit board 71. Alternatively, the strain gauge 62 is directly connected to the second circuit board 72 through a flexible wire, and a strain force signal measured by the strain gauge 62 is directly transmitted to the second circuit board 72.

Refer to FIG. 15. In specific application, one end of the force transmission shaft 24 may be connected to the connecting end 12 of the stylus tip 10. For example, the connecting end 12 of the stylus tip 10 is hollow inside, the first circuit board 71 is disposed in the connecting end 12 along an axis of the stylus 400, the ground electrode 43 is sleeved outside the first circuit board 71, and the force transmission shaft 24 is fixedly connected to the inner wall of the connecting end 12.

For example, the force transmission shaft 24 may be connected to the inner wall of the connecting end 12 of the stylus tip 10 through threaded connection, adhesion, or welding.

The other end of the force transmission shaft 24 is connected to the swing piece 61. Specifically, the swing piece 61 may be, for example, a structure similar to a "U"-shaped frame. One side that is of the swing piece 61 and that is in a radial direction of the stylus rod 20 is fastened to the inner wall of the stylus rod 20, and the other end of the force transmission shaft 24 is fixedly connected to the other side that is of the swing piece 61 and that is in the radial direction of the stylus rod 20

In this way, the one side that is of the swing piece 61 and that is in the radial direction of the stylus rod 20 is fastened in the stylus rod 20. Because the other side is fixedly connected to the force transmission shaft 24, the other side may move with the force transmission shaft 24, and a portion that is of the swing piece 61 and that is connected between two sides swings with the force transmission shaft 24 and is deformed.

The swing piece 61 is fastened to one side of the stylus rod 20, and may be directly and fixedly connected to the inner wall of the stylus rod 20, or is fastened through a fixing sleeve 25 disposed in the stylus rod 20.

For example, the swing piece 61 may be a metal piece, and a portion connected between the inner wall of the stylus rod 20 or an inner wall of the fixing sleeve 25 and the swing piece 61 is usually made of a metal material. For example, a corresponding portion on the inner wall of the stylus rod 20 or the inner wall of the fixing sleeve 25 is covered with a metal layer. The swing piece 61 is welded to the inner wall of the stylus rod 20 or the inner wall of the fixing sleeve 25.

When the swing piece 61 does not swing, there is a gap H2 between the second circuit board 72 and an end surface that is of the swing piece 61 and that faces one side of the second circuit board 72. The gap H2 is used to reserve swinging space for the swing piece 61, so that the end surface that is of the swing piece 61 and that faces the one side of the second circuit board 72 can swing in the gap H2. In this way, the strain gauge 62 can detect an elastic force generated due to swinging of the swing piece 61, and transmit the signal to the second circuit board 72.

It should be noted that the gap H2 between the swing piece 61 and the second circuit board 72 may be greater than the gap H1 between the stylus tip 10 and the stylus rod 20. In this way, movement of the stylus tip 10 drives the swing piece 61 to swing to contact the second circuit board 72. There is still a gap between the stylus tip 10 and the stylus rod 20, to ensure use performance of the stylus 100.

Refer to FIG. 15. The force transmission shaft 24 extends into the swing piece 61 through an end surface that is of the swing piece 61 and that faces one side of the stylus tip 10, and the force transmission shaft 24 is fixedly connected to an inner wall of one side of the swing piece 61, for example, the force transmission shaft 24 is welded or adhered to the inner wall of the side of the swing piece 61.

In this manner, component of the force transmission shaft 24 and the swing piece 61 is complicated, and a through hole is disposed on the end surface that is of the swing piece 61 and that faces the one side of the stylus tip 10. The force transmission shaft 24 extends into the swing piece 61 through the through hole, and is connected to the inner side wall of the swing piece 61. After the component of the force transmission shaft 24 and the swing piece 61 is completed, one side that is of the swing piece 61 and that is fixedly connected to the stylus rod 20 is bent, and then the swing piece 61 is connected to the inner wall of the stylus rod 20 or the inner wall of the fixing sleeve 25 through welding. Because a portion that is of the inner wall of the stylus rod 20 or the inner wall of the fixing sleeve 25 and that is connected to the swing piece 61 is covered with a metal layer, positioning needs to be performed in advance, so that welding accuracy is high.

In view of this, refer to FIG. 16. In this embodiment, one end of the force transmission shaft 24 is connected to the connecting end 12 of the stylus tip 10, and the swing piece 61 is disposed on the other end of the force transmission shaft 24 and is connected to the force transmission shaft 24. In this way, the through hole is prevented from being disposed on the end surface of the swing piece 61, and the force transmission shaft 24 does not need to extend into the swing piece 61 to be connected to the inner wall of the swing piece 61. Therefore, the swing piece 61 can be first connected to the fixing sleeve 25, and then the force transmission shaft 24 and the swing member 61 can be connected. Therefore, a component process of the force transmission shaft 24 and the swing piece 61 can be simplified, and component efficiency of the pressure sensing component 60 can be improved.

Refer to FIG. 16. The entire swing piece 61 may still be a "U"-shaped frame structure. The swing piece 61 includes a first side 611 and a second side 612 that are opposite to each other in a radial direction of the stylus rod 20, an outer wall of the first side 611 of the swing piece 61 is fixedly connected to the force transmission shaft 24, and the second side 612 of the swing piece 61 is fixedly connected to the stylus rod 20, for example, the second side 612 of the swing piece 61 is connected to the fixing sleeve 25 in the stylus rod 20.

A swing portion 613 of the swing piece 61 is connected between the first side 611 and the second side 612 of the swing piece 61. For example, the swing portion 613 may include an end surface that is of the swing piece 61 and that faces one side of the stylus tip 10 and an end surface that is of the swing piece 61 and that faces one side of the second circuit board 72. The strain gauge 62 is attached to an outer surface that is of the swing portion 613 and that faces one side of the second circuit board 72.

During component, the swing portion 613 between the two sides of the swing piece 61 can be bent in advance. One end that is of the swing portion 613 and that needs to be fastened to the stylus rod 20 is bent to form the second side 612 of the swing piece 61. The second side 612 of the swing piece 61 is first fixedly connected to the fixing sleeve 25, and then the outer wall of the first side 611 of the swing piece 61 is connected to the force transmission shaft 24. This can simplify a component process and improve component efficiency.

Refer to FIG. 16. The force transmission shaft 24 includes a first section 241 and a second section 242 along an axis direction of the stylus rod 20, and the first section 241 of the force transmission shaft 24 is connected to the connecting end 12 of the stylus tip 10, for example, the first section 241 of the force transmission shaft 24 is connected to the inner wall of the connecting end 12 of the stylus tip 10. The second section 242 of the force transmission shaft 24 extends along the outer wall of the first side 611 of the swing piece 61, the swing piece 61 is located on the second section 242 of the force transmission shaft 24, and the second section 242 of the force transmission shaft 24 is connected to the outer wall of the first side 611 of the swing piece 61.

In actual application, the swing piece 61 is usually located in the straight cylinder section 20b of the stylus rod 20. To ensure that a sufficient elastic force can be transmitted due to swinging and deformation of the swing piece 61, the swing portion 613 of the swing piece 61 needs to occupy as much space as possible in a radial direction of the straight cylinder section 20b of the stylus rod 20.

Therefore, as shown in FIG. 16, the first side 611 of the swing piece 61 is usually closer to the inner wall of the stylus rod 20 than the first section 241 of the force transmission shaft 24. In view of this, in this embodiment, the force transmission shaft 24 further includes a retaining wall 243 connected between the first section 241 and the second section 242, a first end of the retaining wall 243 is connected to the first section 241, a second end of the retaining wall 243 is connected to the second section 242, the second end of the retaining wall 243 is closer to the inner wall of the stylus rod 20 than the first end, and the second side 612 of the swing piece 61 may be close to the retaining wall 243.

The retaining wall 243 is disposed on the force transmission shaft 24, the retaining wall 243 is connected between the first section 241 and the second section 242 of the force transmission shaft 24, the first end of the retaining wall 243 is connected to the first section 241, and the second end of the retaining wall 243 is connected to the second section 242. In this way, the second section 242 of the force transmission shaft 24 can drive the first side 611 of the swing piece 61 to move, the swing portion 613 of the swing piece 61 is inclined, the strain gauge 62 is deformed, and a deformation amount is transmitted to the first circuit board 71 or the second circuit board 72.

For example, the retaining wall 243 of the force transmission shaft 24 may extend along a radial direction of the stylus rod 20, and the retaining wall 243 of the force transmission shaft 24 is perpendicular to the first section 241 and the second section 242 of the force transmission shaft 24.

In the descriptions of embodiments of this application, it should be noted that the terms "mounting" and "connection" need to be broadly understood, for example, may be a fixed connection, or may be indirectly connected through an intermediate medium, or may be communication between two elements or an interaction between two elements, unless otherwise specified and defined. A person of ordinary skill in the art may understand specific meaning of the foregoing terms in embodiments of this application in specific circumstances.

The terms "first", "second", "third", "fourth", and the like (if existent) in this application are used to distinguish between similar objects, but are not necessarily used to describe a particular order or sequence.

What is claimed is:

1. A stylus, comprising:
a stylus rod having a stylus tip at one end of the stylus rod; and
a first electrode, a second electrode, and a circuit board;
wherein the first electrode is disposed in the stylus tip, the second electrode is disposed on the stylus rod, and the second electrode is electrically connected to the circuit board;
wherein the circuit board controls the second electrode to transmit a signal used to determine an inclination angle of the stylus;
wherein the second electrode is disposed on a fastener, wherein the fastener comprises a connecting sleeve, and the connecting sleeve is fastened to the stylus rod;
wherein the second electrode is disposed on an outer wall of the connecting sleeve; and
wherein an accommodating groove is disposed on the outer wall of the connecting sleeve, a protruding part fitting the accommodating groove is disposed on the second electrode, and the second electrode is disposed on the outer wall of the connecting sleeve through fitting between the protruding part and the accommodating groove.

2. The stylus according to claim 1, wherein the stylus rod comprises a tapered cylinder section and a straight cylinder section, the tapered cylinder section is located between the stylus tip and the straight cylinder section, the second electrode is disposed on an inner wall of the tapered cylinder section, and at least part of the connecting sleeve is located in the tapered cylinder section.

3. The stylus according to claim 2, wherein the connecting sleeve is a conductive sleeve, and the second electrode is electrically connected to the circuit board through the connecting sleeve.

4. The stylus according to claim 3,
wherein a conductive spring is disposed on an outer wall that is of the connecting sleeve and that faces one end of the stylus tip, and the second electrode is in contact with the conductive spring; and
wherein a flexible electrical connecting piece is connected between the outer wall of the connecting sleeve and the circuit board.

5. The stylus according to claim 1, wherein the connecting sleeve is a conductive sleeve, and a flexible electrical connecting piece is connected between the outer wall of the connecting sleeve and the circuit board.

6. The stylus according to claim 1, wherein one end of the flexible electrical connecting piece extends into the accommodating groove to be in contact with the second electrode, and the other end of the flexible electrical connecting piece is connected to the circuit board.

7. The stylus according to claim 1, wherein the second electrode is integrated on a flexible circuit board, the flexible circuit board is attached to the outer wall of the connecting sleeve, a pin protrudes from the flexible circuit board, and the pin is connected to the circuit board.

8. The stylus according to claim 1, wherein the first electrode is a transmitting electrode, and the second electrode comprises a signal transmitting circuit and a signal receiving circuit.

9. The stylus according to claim 1,
wherein the one end of the stylus tip is a writing end, the other end of the stylus tip is a connecting end, and the connecting end extends into the stylus rod; and
wherein the first electrode is located at the writing end.

10. The stylus according to claim 9, further comprising:
a pressure sensing component comprising a swing piece and a strain gauge; and
a spindle component comprising a force transmission shaft;
wherein one end of the force transmission shaft is connected to the connecting end of the stylus tip, the other end of the force transmission shaft is connected to an outer wall of the swing piece, the strain gauge is attached to one end of the swing piece facing the circuit board, and the strain gauge is electrically connected to the circuit board.

11. The stylus according to claim 10,
wherein the force transmission shaft comprises a first section and a second section, the swing piece comprises a first side and a second side that are opposite to each other, and a swing portion of the swing piece is connected between the first side and the second side; and
wherein the first section of the force transmission shaft is connected to the connecting end of the stylus tip, the swing piece is disposed on the second section of the force transmission shaft, an outer wall of the first side of the swing piece is connected to the second section of the force transmission shaft, and the second side of the swing piece is fixedly disposed in the stylus rod.

12. An electronic device component, comprising:
an electronic device; and
a stylus comprising a stylus rod having a stylus tip at one end of the stylus rod;
wherein a first electrode is disposed in the stylus tip, a second electrode is disposed on the stylus rod, the second electrode is electrically connected to a circuit board;
wherein the circuit board controls the second electrode to transmit a signal used to determine an inclination angle of the stylus:
wherein the second electrode is disposed on a fastener, wherein the fastener comprises a connecting sleeve, and the connecting sleeve is fastened to the stylus rod;
wherein the second electrode is disposed on an outer wall of the connecting sleeve; and
wherein an accommodating groove is disposed on the outer wall of the connecting sleeve, a protruding part fitting the accommodating groove is disposed on the second electrode. and the second electrode is disposed on the outer wall of the connecting sleeve through fitting between the protruding part and the accommodating groove.

13. The electronic device component according to claim 12, further comprising:

a wireless keyboard, wherein the wireless keyboard comprises an accommodating portion for accommodating the stylus.

14. The electronic device component according to claim 13, wherein the accommodating portion is a cavity of an opening.

15. An electronic device system, comprising:
a stylus; and
a tablet,
wherein the stylus and tablet are connected through a communication network; and
wherein the stylus comprises a stylus rod having a stylus tip at one end of the stylus rod;
wherein a first electrode is disposed in the stylus tip, a second electrode is disposed on the stylus rod, the second electrode is electrically connected to a circuit board; and
wherein the circuit board controls the second electrode to transmit a signal used to determine an inclination angle of the stylus;
wherein the second electrode is disposed on a fastener, wherein the fastener comprises a connecting sleeve, and the connecting sleeve is fastened to the stylus rod;
wherein the second electrode is disposed on an outer wall of the connecting sleeve; and
wherein an accommodating groove is disposed on the outer wall of the connecting sleeve, a protruding part fitting the accommodating groove is disposed on the second electrode, and the second electrode is disposed on the outer wall of the connecting sleeve through fitting between the protruding part and the accommodating groove.

16. The electronic device system according to claim 15, further comprising:
a wireless keyboard configured to provide an input to the tablet;
wherein a touch area is disposed on the wireless keyboard, and the stylus interacts with the touch area of the wireless keyboard to provide an input to the wireless keyboard.

* * * * *

UNITED STATES PATENT AND TRADEMARK OFFICE
CERTIFICATE OF CORRECTION

PATENT NO. : 12,216,838 B2
APPLICATION NO. : 17/801015
DATED : February 4, 2025
INVENTOR(S) : Zhao et al.

It is certified that error appears in the above-identified patent and that said Letters Patent is hereby corrected as shown below:

On the Title Page

Applicant (71): "Honor Device Co., Ltd., Guangdong (CN)" should read -- Honor Device Co., Ltd., Shenzhen (CN) --.

In the Claims

Claim 12, Column 32, Line 53: "of the stylus:" should read -- of the stylus; --.

Claim 12, Column 32, Line 62: "second electrode. and the second electrode is disposed" should read -- second electrode, and the second electrode is disposed --.

Signed and Sealed this
Eleventh Day of March, 2025

Coke Morgan Stewart
*Acting Director of the United States Patent and Trademark Office*